United States Patent
Fedoryszak et al.

(10) Patent No.: US 11,334,636 B2
(45) Date of Patent: May 17, 2022

(54) REAL-TIME EVENT DETECTION ON SOCIAL DATA STREAMS

(71) Applicant: Twitter, Inc., San Francisco, CA (US)

(72) Inventors: Mateusz Fedoryszak, London (GB); Brent Frederick, New York, NY (US); Vijayendrasastha Rajaram, New York, NY (US); Changtao Zhong, London (GB)

(73) Assignee: Twitter, Inc., San Francisco, CA (US)

( * ) Notice: Subject to any disclaimer, the term of this patent is extended or adjusted under 35 U.S.C. 154(b) by 46 days.

(21) Appl. No.: 16/776,375

(22) Filed: Jan. 29, 2020

(65) Prior Publication Data

US 2020/0250249 A1 Aug. 6, 2020

Related U.S. Application Data

(60) Provisional application No. 62/798,388, filed on Jan. 29, 2019.

(51) Int. Cl.
| | | |
|---|---|---|
| *G06F 16/95* | (2019.01) | |
| *G06F 16/9536* | (2019.01) | |
| *G06F 16/906* | (2019.01) | |
| *G06F 16/9537* | (2019.01) | |
| *G06F 16/9538* | (2019.01) | |
| *H04L 51/52* | (2022.01) | |

(52) U.S. Cl.
CPC ........ *G06F 16/9536* (2019.01); *G06F 16/906* (2019.01); *G06F 16/9537* (2019.01); *G06F 16/9538* (2019.01); *H04L 51/32* (2013.01)

(58) Field of Classification Search
CPC . G06F 16/906; G06F 16/9536; G06F 16/9537
See application file for complete search history.

(56) References Cited

U.S. PATENT DOCUMENTS

| | | | | |
|---|---|---|---|---|
| 6,437,804 | B1 * | 8/2002 | Ibe .......................... | G06F 30/18 |
| | | | | 715/736 |
| 9,507,819 | B2 * | 11/2016 | Gross ...................... | G06F 16/24 |
| 2013/0275527 | A1 | 10/2013 | Deurloo | |
| 2013/0325851 | A1 * | 12/2013 | Crudele ................ | G06F 16/248 |
| | | | | 707/722 |

(Continued)

OTHER PUBLICATIONS

International Search Report & Written Opinion for PCT Application No. PCT/US2020/015732, dated May 4, 2020, 13 pages.

(Continued)

*Primary Examiner* — Baoquoc N To
(74) *Attorney, Agent, or Firm* — Brake Hughes Bellermann LLP

(57) ABSTRACT

According to an aspect, a method for event detection on social data streams includes receiving a stream of messages exchanged on a messaging platform, and detecting an event from the stream of messages, which may include detecting a first cluster group of trending entities over a first period of time, detecting a second group of trending entities over a second period of time, and generating a cluster chain by linking the second cluster group with the first cluster group, where the cluster chain represents the detected event over the first and second periods of time. The method includes storing the event as the cluster chain in a memory device on the messaging platform.

28 Claims, 14 Drawing Sheets

(56) References Cited

U.S. PATENT DOCUMENTS

| | | |
|---|---|---|
| 2016/0239581 A1 | 8/2016 | Jaidka et al. |
| 2017/0116189 A1* | 4/2017 | Chigusa ............... G06F 16/3331 |
| 2019/0033842 A1* | 1/2019 | Ceschini ................. G06F 9/542 |
| 2019/0158925 A1* | 5/2019 | Yelton ................ H04N 21/4826 |

OTHER PUBLICATIONS

Hasan, et al., "Real-Time Event Detection From the Twitter Data Stream Using the Twitternews+ Framework", Information Processing & Management, vol. 56, No. 3, May 1, 2019, pp. 1146-1165.
Hasan, et al., "Twitternews+: A Framework for Real Time Event Detection From the Twitter Data Stream", International Conference on Financial Cryptography and Data Security, Sections 1, 5-7, Table 1, Table 3, Oct. 23, 2016, pp. 224-239.
Archambault, et al., "ThemeCrowds: Multiresolution summaries of twitter usage", Proceedings of the 3rd international workshop on Search and mining user-generated contents, ACM, 2011, pp. 77-84.
Atefeh, et al., "A survey of techniques for event detection in twitter", Computational Intelligence, vol. 31, Issue 1, 2015, pp. 132-164.
Bagga, et al., "Entity-based cross-document coreferencing using the Vector Space Model", Proceedings of the 36th Annual Meeting of the Association for Computational Linguistics, 1998, pp. 79-85.
Becker, et al., "Beyond Trending Topics: Real-World Event Identification on Twitter", ICWSM 11, 2011, pp. 438-441.
Blondel, et al., "Fast unfolding of communities in large networks", Journal of statistical mechanics: theory and experiment 2008 (10), 2008, 12 pages.
Chakrabarti, et al., "Evolutionary clustering", KDD '06, Aug. 2006, pp. 554-560.
Cision, "2017 Global Social Journalism Study", https://www.cision.com/us/resources/research-reports/2017-global-social-journalism-study/?sf=false, 2017, 39 pages.
Cohen, "Social Networks Finally Bypassed Print Newspapers as a Primary Source of News", https://www.adweek.com/digital/social-networks-finally-bypassed-print-newspapers-as-a-primary-source-of-news/, Jan. 13, 2019, 1 page.
Dork, et al., "A visual backchannel for large-scale events", IEEE transactions on visualization and computer graphics 16 (6), Jan. 2011, pp. 1129-1138.
Edouard, et al., "Graph-based event extraction from twitter", RANLP17, Jul. 2017, 10 pages.
Fung, et al., "Parameter free bursty events detection in text streams", Proceedings of the 31st international conference on Very large data bases, Aug. 2005, pp. 181-192.
Gaglio, et al., "A framework for real-time Twitter data analysis", Computer Communications, 2015, pp. 236-242.
Guille, et al., "Event detection, tracking, and visualization in twitter: a mention-anomaly-based approach", Social Network Analysis and Mining 5, Article No. 18, 2015, 17 pages.
Hasan, et al., "A survey on real-time event detection from the twitter data stream", Journal of Information Science, vol. 14(4), Mar. 2017, 0165551517698564, pp. 443-463.
Hasan, et al., "TwitterNews: real time event detection from the Twitter data stream", PeerJ PrePrints 4, 2016, e2297v1, 8 pages.
Instagram Engineering, "Trending on Instagram", https://instagram-engineering.com/trending-on-instagram-5749450e6d93, Jul. 6, 2015, 11 pages.
Kuhn, "The Hungarian method for the assignment problem", Naval research logistics quarterly 2, 1-2, 1955, pp. 83-97.
Lee, et al., "Incremental cluster evolution tracking from highly dynamic network data", IEEE 30th International Conference on Data Engineering (ICDE), 2014, pp. 3-14.
Li, "Building a new trends experience", https://blog.twitter.com/engineering/en_us/a/2015/building-a-new-trends-experience.html, Apr. 24, 2015, 6 pages.
Li, et al., "Online bursty event detection from microblog", Proceedings of the 2014 IEEE/ACM 7th International Conference on Utility and Cloud Computing, Dec. 2014, pp. 865-870.
Li, et al., "Realtime novel event detection from social media", IEEE 33rd International Conference on Data Engineering (ICDE), 2017, pp. 1129-1139.
Li, et al., "Twevent: segment-based event detection from tweets", Proceedings of the 21st ACM international conference on Information and knowledge management, ACM, 2012, pp. 155-164.
Mathioudakis, et al., "Twittermonitor: trend detection over the twitter stream", Proceedings of the ACM SIGMOD International Conference on Management of data, ACM, 2010, 3 pages.
McMinn, et al., "Building a large-scale corpus for evaluating event detection on twitter", Proceedings of the 22nd ACM International conference on Information & Knowledge Management, ACM, 2013, pp. 409-418.
McMinn, et al., "Real-time entity-based event detection for twitter", International conference of the cross-language evaluation forum for european languages, Nov. 2015, pp. 65-77.
Namazifar, "Named Entity Sequence Classification", arXiv preprint arXiv:1712.02316, Dec. 2017, 14 pages.
Newman, "The structure and function of complex networks", SIAM review, vol. 45, No. 2, 2003, pp. 167-256.
Orr, et al., "Event Detection with Neural Networks: A Rigorous Empirical Evaluation", Proceedings of the 2018 Conference on Empirical Methods in Natural Language Processing, arXiv preprint arXiv:1808.08504, 2018, pp. 999-1004.
Osborne, et al., "Real-time detection, tracking, and monitoring of automatically discovered events in social media", Proceedings of the 52nd Annual Meeting of the Association for Computational Linguistics: System Demonstrations, 2014, pp. 37-42.
Parikh, et al., "Et: events from tweets", Proceedings of the 22nd international conference on world wide web, ACM, May 2013, pp. 613-620.
Petrović, et al., "Streaming first story detection with application to twitter", Human Language Technologies: The 2010 Annual Conference of the North American Chapter of the ACL, 2010, pp. 181-189.
Rand, "Objective criteria for the evaluation of clustering methods", Journal of the American Statistical Association 66:336, 1971, pp. 846-850.
Reichardt, et al., "Statistical mechanics of community detection", Physical Review E 74, 1, 2006, 16 pages.
Ritchie, "Streaming MapReduce with Summingbird", https://blog.twitter.com/engineering/en_us/a/2013/streaming-mapreduce-with-summingbird.html, Sep. 3, 2013, 5 pages.
Stilo, et al., "Efficient temporal mining of micro-blog texts and its application to event discovery", Data Mining and Knowledge Discovery 30, 2, 2016, pp. 372-402.
Von Nordheim, et al., "Sourcing the Sources: An analysis of the use of Twitter and Facebook as a journalistic source over 10 years in The New York Times, The Guardian, and Suddeutsche Zeitung", Digital Journalism 6, 7, 2018, pp. 307-828.
Weng, et al., "Event detection in twitter", ICWSM 11, 2011, pp. 401-408.
Yang, et al., "A study of retrospective and on-line event detection", Proceedings of the 21st annual international ACM SIGIR conference on Research and development in information retrieval, ACM, 1998, pp. 28-36.

* cited by examiner

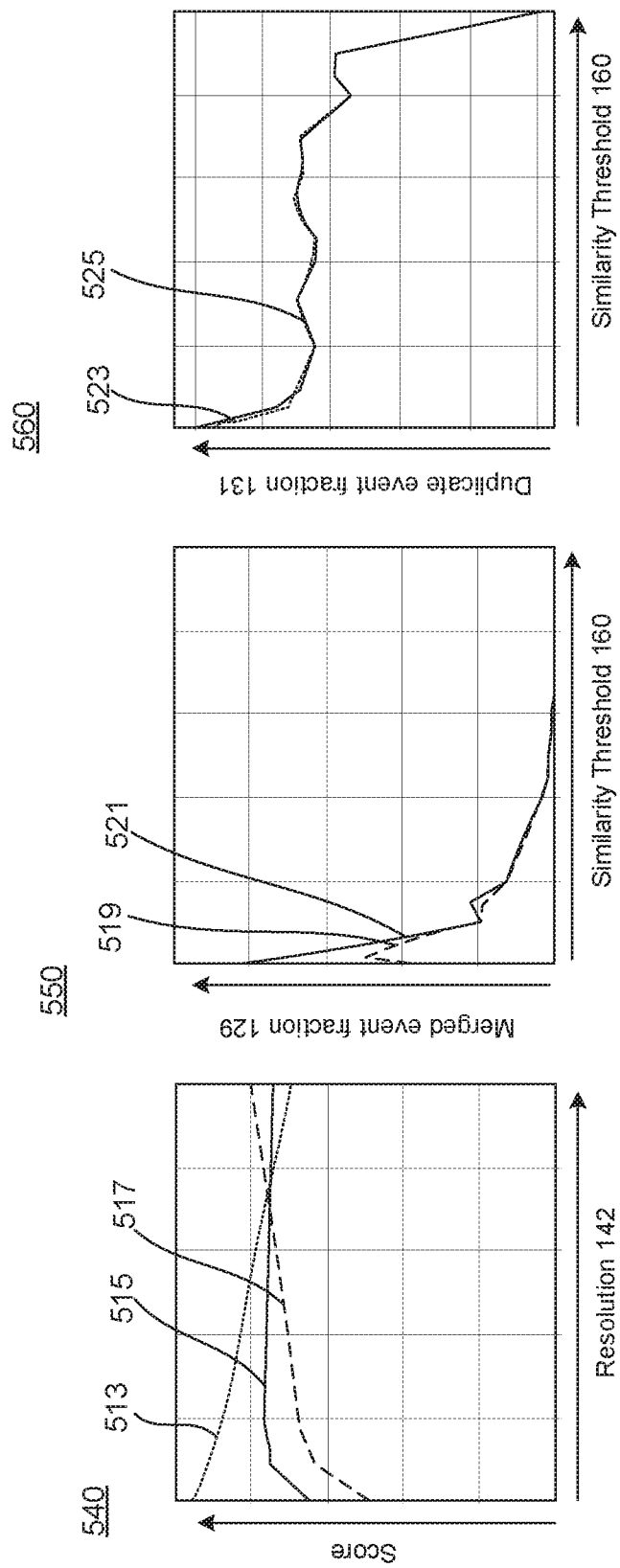

REAL-TIME EVENT DETECTION ON SOCIAL DATA STREAMS

RELATED APPLICATION

This application is a non-provisional of, and claims priority to, U.S. Provisional Application No. 62/798,388, filed on Jan. 29, 2019, entitled "Real-Time Event Detection on Social Data Streams," the disclosure of which is incorporated herein in its entirety.

BACKGROUND

Social networks are quickly becoming the primary medium for discussing what is happening around real-world events. Some conventional approaches may involve determining what events are discussed on the social media platform at a given instance of time, e.g., a point in time analysis. However, these conventional approaches may fail to consider the evolution of the event and may be susceptible to memory problems with high volume datasets or topic counts, which are often produced in a large-scale social media network.

SUMMARY

Techniques, methods, and systems are disclosed herein for event detection that tracks events over time, which includes modeling an event as a cluster chain, e.g., a list of linked cluster groups over time. For example, the messaging system may periodically identify trending entities from a message stream of messages exchanged on a messaging platform. The identification of trending entities from the message stream may be referred to as burst detection. In some examples, the message stream is relatively large (e.g., over 5K messages per second). A trending entity may be an entity that appears in the message stream at an unusually high rate or at a rate above a threshold condition. In some examples, a trending entity may be a word (or words), a phrase, a hashtag, an identifier (e.g., user identifier, message identifier, etc.), a web resource (e.g., URL), and/or any content that refers to a specific object. The messaging system may periodically perform similarity-based clustering operations on the trending entities to detect one or more cluster groups, where each cluster group includes two or more trending entities that are determined to be similar to each other (e.g., associated with a similarity value greater than a threshold level).

In particular, the messaging system may receive the detected trending entities from a first time period and perform the similarity-based clustering operations on the trending entities from the first time period to detect one or more cluster groups. Then, the messaging system may receive the detected trending entities from a second time period and perform the similarity-based clustering operations on the trending entities from the second time period to detect one or more subsequent cluster groups. If the subject matter of a cluster group from the second time period is determined to be similar to the subject matter of a cluster group from the first time period, these cluster groups (across the different time periods) are linked together, thereby forming the cluster chain. By continuously (e.g., periodically) detecting and linking cluster groups over time (and in real-time or substantially real-time), terms that are used to describe the event on the messaging system at different points during the lifetime of the event may be captured by the cluster chain. As such, in contrast to some conventional approaches that use static event detection (e.g., detecting events from a snapshot of data), the event detection provided by the messaging system is dynamic in order to account for the dynamic nature of what is discussed on the messaging system.

In some examples, the burst detection operations are executed independently from the clustering operations (e.g., executable by separate CPUs and memory devices). By separating the burst detection operations from the clustering operations, some of the clustering operations (or all of them) may be executed in parallel with the burst detection operations, which may increase the speed of event detection (especially for social media platforms that handle a large amount of data). In addition, these components are independently scalable, which may increase the speed of event detection and increase the flexibility of the messaging system to adjust to the varying processing loads of burst detection and entity clustering, and to enable the tracking of events in real-time.

The messaging platform may transmit digital data to a client application to render information about the event(s) in the user interface of the client application. The information about the event(s) may include information from the cluster chains. The cluster chain information may identify one or more events and identify one or more trending entities from the cluster chain. In some examples, the cluster chain information is included into a trends section of the client application. For example, the trends section may identify a list of trending entities (or topics). In one particular example, the hashtag "#bucks" may be trending and included as part of an event represented by a cluster chain. The cluster chain may also identify an entity "Giannis" within another cluster group linked to the cluster group that includes the hashtag "#bucks." The trends section may identify the related term "Giannis" (and other related terms from the cluster chain) along with the trending entity "#bucks."

The messaging platform may transmit digital data to the client application to render a timeline of messages. The timeline may include a stream of messages from accounts having relationships with the account of the user in a connection graph. In some examples, the timeline is ranked, and the ranking of the messages may be based (in part) on the detected event. For example, the event may include event metadata that identifies the detected start time of the event and the detected end time of the event. A timeline manager may receive the event, which identifies the trending entities across the different cluster groups that belong to that event (or cluster chain). The timeline manager may determine whether a message to be rendered as part of the user's timeline includes a trending entity from the cluster chain during the duration of the event (e.g., between the detected start time and the detected end time). If that message includes a trending entity that is part of the cluster chain during the duration of the event, the timeline manager may boost (or up-rank) that message within the ranking of the user's timeline.

In some examples, the timeline includes promoted content, which may include advertisement messages. Similar to the messages to be delivered according to the connection graph, a promoted message may be boosted in the timeline's ranking if that promoted message includes a trending entity from the cluster chain during the event's duration. In some examples, the messaging platform includes an advertisement stack engine configured to determine pricing for promoted messages. In some examples, the advertisement stack engine may increase its pricing for promoted content if the promoted content includes one or more trending entities during the duration of the event. In some examples, the cluster chain information is included as part of search results returned to the user. For example, a user may submit a query search, and a search manager may use the cluster chains to expand the search results to include other related entities.

According to an aspect, a method for event detection on social data streams includes receiving, by a messaging platform, a stream of messages exchanged on a messaging platform, and detecting, by the messaging platform, an event from the stream of messages. The detecting step includes detecting a first cluster group of trending entities over a first period of time, detecting a second cluster group of trending entities over a second period of time, and generating a cluster chain by linking the second cluster group with the first cluster group, where the cluster chain represents the detected event over the first and second periods of time. The first cluster group includes at least two trending entities identified as similar to each other. The second cluster group includes at least two trending entities identified as similar to each other. The method includes storing, by the messaging platform, the event as the cluster chain in a memory device on the messaging platform. In some examples, a system or non-transitory computer-readable medium may be provided with these operations.

According to some aspects, a method, system, or non-transitory computer readable medium may include one or more of the following features (or any combination thereof). The method may include transmitting, by the messaging platform, digital data to a client application to render information about the event in a user interface of the client application, where the information about the event includes information from the cluster chain. The information about the event identifies a first trending entity from the first cluster group and a second trending entity from the second cluster group, the second trending entity being different than the first trending entity. The method may include ranking cluster groups within the cluster chain including ranking the first cluster group and the second cluster group based on popularity of entities associated with each respective cluster group. The method may include extracting entities from the stream of messages, obtaining a list of trending entities derived from a trend detector service, and identifying the trending entities from the extracted entities based on the list of trending entities derived from the trend detector service. The method may include assigning a cluster identifier to the first cluster group and assigning the cluster identifier of the first cluster group to the second cluster group in response to the second cluster group being linked to the first cluster group. The detecting the first cluster group may include generating a similarity graph based on similarity values associated with the trending entities of the first period of time, where the similarity graph includes nodes represents the trending entities over the first period of time and edges representing the similarity values, and partitioning the similarity graph according to a clustering algorithm to detect the first cluster group. The method may include computing the similarity values based on frequency count and co-occurrences among the trending entities over a time window, and filtering the similarity graph based on a similarity threshold such that edges having similarity values less than the similarity threshold are removed from the similarity graph, where the filtered similarity graph is partitioned according to the clustering algorithm to detect the first cluster group. The second cluster group may be linked the first cluster group based on a maximum weighted bipartite matching.

According to an aspect, a messaging system for detecting real-time event includes a messaging platform configured to exchange, over a network, messages to computing devices, and a client application configured to communicate with the messaging platform to send and receive messages. The messaging platform is configured to detect a first cluster group of trending entities over a first period of time, detect a second cluster group of trending entities over a second period of time, generate a cluster chain by linking the second cluster group with the first cluster group based on a number of trending entities being shared between the first cluster group and the second cluster group, where the cluster chain represents the detected event over the first and second periods of time, and store an event as the cluster chain in a memory device on the messaging platform, where the cluster chain is retrievable for future cluster linking. In some examples, a method or non-transitory computer-readable medium may be provided with these operations.

According to some aspects, a method, system, or non-transitory computer readable medium may include one or more of the above/below features (or any combination thereof). The messaging platform is configured to transmit digital data to the client application to render information about the event in a user interface of the client application, where the information about the event includes information from the cluster chain, and the information from the cluster chain is rendered in a trends section, a timeline, or part of search results returned to the client application. The messaging platform is configured to rank the first cluster group and the second cluster group based on an aggregate popularity metric associated with each cluster group. The plurality of entities includes trending entities, and the messaging platform is configured to extract entities from the stream of messages, obtain a list of trending entities derived from a trend detector service, and identify the trending entities from the extracted entities based on the list of trending entities. The messaging platform is configured to assign a same cluster identifier to cluster groups of a single cluster chain. The messaging platform is configured to compute similarity values based on frequency count and co-occurrences among the plurality of entities over a time window and generate a similarity graph based on the similarity values, where the similarity graph includes nodes representing the plurality of entities and edges representing or being annotated with the similarity values.

According to an aspect, a non-transitory computer-readable medium storing executable instructions that when executed by at least one processor are configured to cause the at least one processor to receive, by a messaging platform, a stream of messages exchanged on a messaging platform, detect, by the messaging platform, an event from the stream of messages, including identify a plurality of entities from the stream of messages, detect a first cluster group from the plurality of entities over a first period of time, detect a second cluster group from the plurality of entities over a second period of time, and generate a cluster chain by linking the second cluster group with the first cluster group based on a number of entities being shared between the first cluster group and the second cluster group, where the cluster chain represents the detected event over the first and second periods of time, store, by the messaging platform, the event as the cluster chain in a memory device on the messaging platform, and transmit, by the messaging platform, digital data to a client application to render information about the event in a user interface of the client application, where the information about the event includes information from the cluster chain, and the information from the cluster chain identifies a first entity from the first cluster group and a second entity from the second cluster group. In some examples, a method or system may be provided with these operations.

According to some aspects, a method, system, or non-transitory computer readable medium may include one or more of the above/below features (or any combination thereof). The operations may include rank the first cluster group and the second cluster group based on a popularity metric associated with each respective cluster group. The plurality of entities includes trending entities, and the operations may include extract entities from the stream of messages, the entities including at least one of named entities or hashtags, obtain a list of trending entities derived from a trend detector service via a server communication interface, and identify the trending entities from the extracted entities based on the list of trending entities such that non-trending entities are filtered out of the extracted entities. The operations may include assign a cluster identifier to the first cluster group and assign the cluster identifier of the first cluster group to the second cluster group in response to the second cluster group being linked to the first cluster group. The operations may include compute similarity values based on frequency count and co-occurrences among the plurality of entities over a time window, where each similarity value indicates a level of similarity between two entities, generate a similarity graph based on the similarity values, where the similarity graph includes nodes representing the plurality of entities and edges representing the similarity values, filter the similarity graph based on a similarity threshold value such that edges having similarity values less than the similarity threshold are removed from the similarity graph, and partition the filtered similarity graph according to a clustering algorithm to detect the first cluster group, where the clustering algorithm includes a Louvain algorithm.

According to an aspect, a messaging system for detecting real-time event on a social media stream includes a messaging platform configured to exchange, over a network, messages to computing devices. The messaging platform includes an event detector configured to execute in an offline mode and an online mode. The event detector, in the offline mode, is configured to execute an event detection algorithm on an evaluation dataset stream to generate one or more first cluster chains for varying values of a control parameter, and compute a performance metric regarding the execution of the event detection algorithm for the varying values of the control parameter, where a value of the control parameter is selected based on the performance metric. The event detector, in the online mode, is configured to receive a message stream for messages exchanged on the messaging platform in real-time and execute the event detection algorithm on the message stream according to the selected value of the control parameter to generate one or more second cluster chains. In some examples, a method or non-transitory computer-readable medium may be provided with these operations.

According to some aspects, a method, system, or non-transitory computer readable medium may include one or more of the above/below features (or any combination thereof). In some examples, the performance metric includes at least one of discrimination or consolidation, and the control parameter includes a similarity threshold. In some examples, the performance metric includes at least one of discrimination or consolidation, and the control parameter includes a resolution of a clustering algorithm. In some examples, the performance metric includes a clustering score. In some examples, the performance metric includes events detected fraction. In some examples, the performance metric includes merged event fraction. In some examples, the performance metric includes duplicate event fraction. In some examples, the control parameter includes a time window.

BRIEF DESCRIPTION OF DRAWINGS

FIGS. 5A through 5F illustrate various graphs depicting performance metrics and parameters of the event detector in the offline analysis mode according to an aspect.

DETAILED DISCLOSURE

Figure 1A:
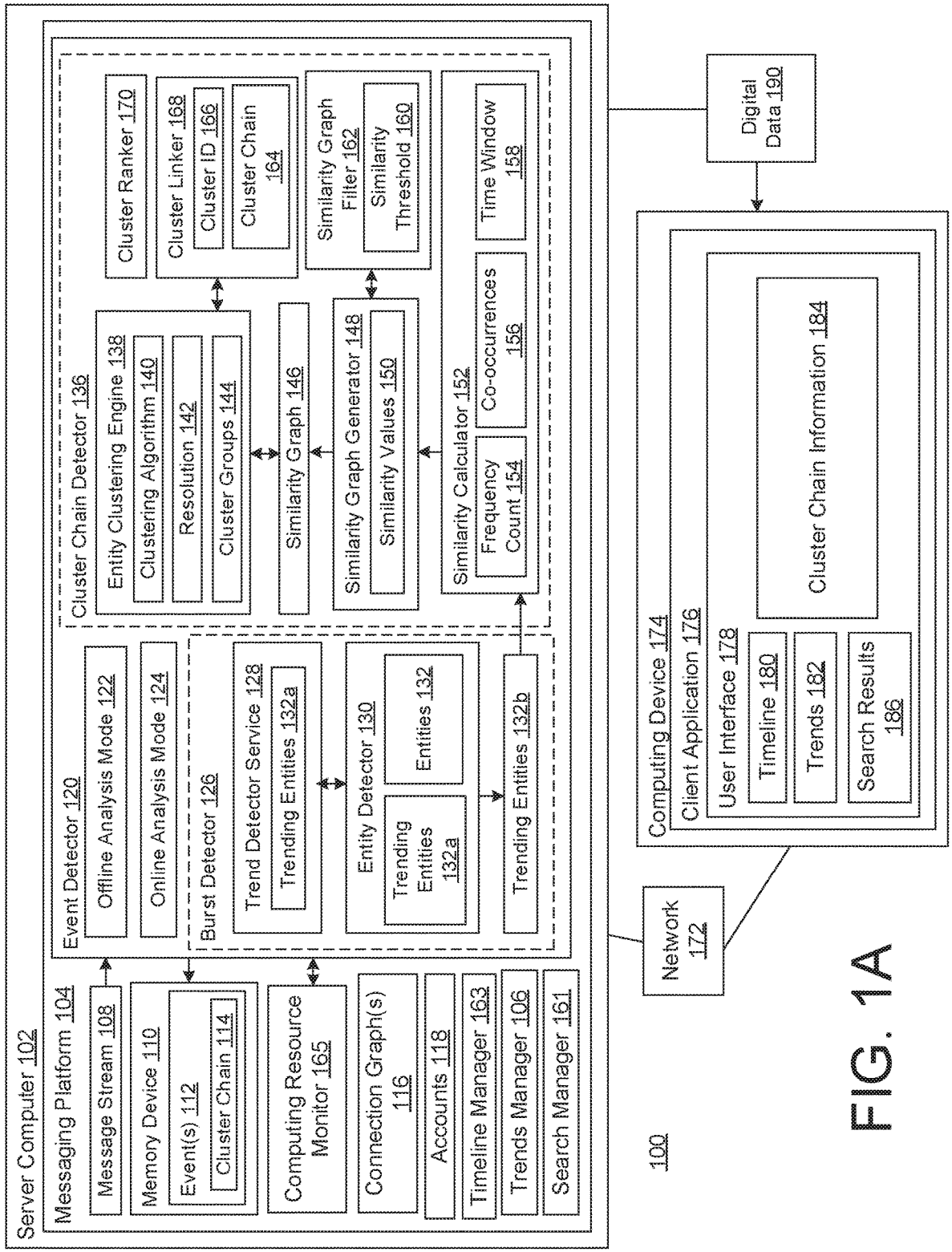
FIG. 1A illustrates a messaging system having an event detector configured to detect and track an event as a cluster chain over time according to an aspect.

FIGS. 1A through 1E illustrate a messaging system 100 for detecting and tracking events 112, over time, from a message stream 108 according to an aspect. For example, instead of determining which events 112 are discussed on the messaging system 100 at a particular time using a point-in-time analysis, the messaging system 100 represents the events 112 over time by modeling an event 112 as a cluster chain 114 having a linked list of cluster groups 144.

The messaging system 100 may periodically identify trending entities 132b from the message stream 108. A trending entity 132b may be an entity that appears in the message stream 108 at an unusually high rate or at a rate above a threshold condition, where the trending entity 132b is a tag for content in a message of the message stream 108 (e.g., named entities, hashtags, URLs, user identifiers, and/or message identifiers, etc.). The messaging system 100 may periodically perform similarity-based clustering operations on the trending entities 132 to detect one or more cluster groups 144. For example, the messaging system 100 may receive the detected trending entities 132b from a first time period (e.g., a given time interval) and perform the similarity-based clustering operations on the trending entities 132b from the first time period to detect one or more cluster groups 144. A particular cluster group 144 may include two or more trending entities 132b that are determined to be similarly related to each other (e.g., trending entities 132b from the same cluster group 144 may be considered to semantically refer to the same or similar subject matter). Then, the messaging system 100 may receive the detected trending entities 132b from a second time period (e.g., the next time interval) and perform the similarity-based clustering operations on the trending entities 132b from the second time period to detect one or more subsequent cluster groups 144. If the subject matter of a cluster group 144 from the second time period is determined to be similar to the subject matter of a cluster group 144 from the first time period, these cluster groups 144 (across the different time periods) are linked together, thereby forming the cluster chain 114.

Figure 1B:
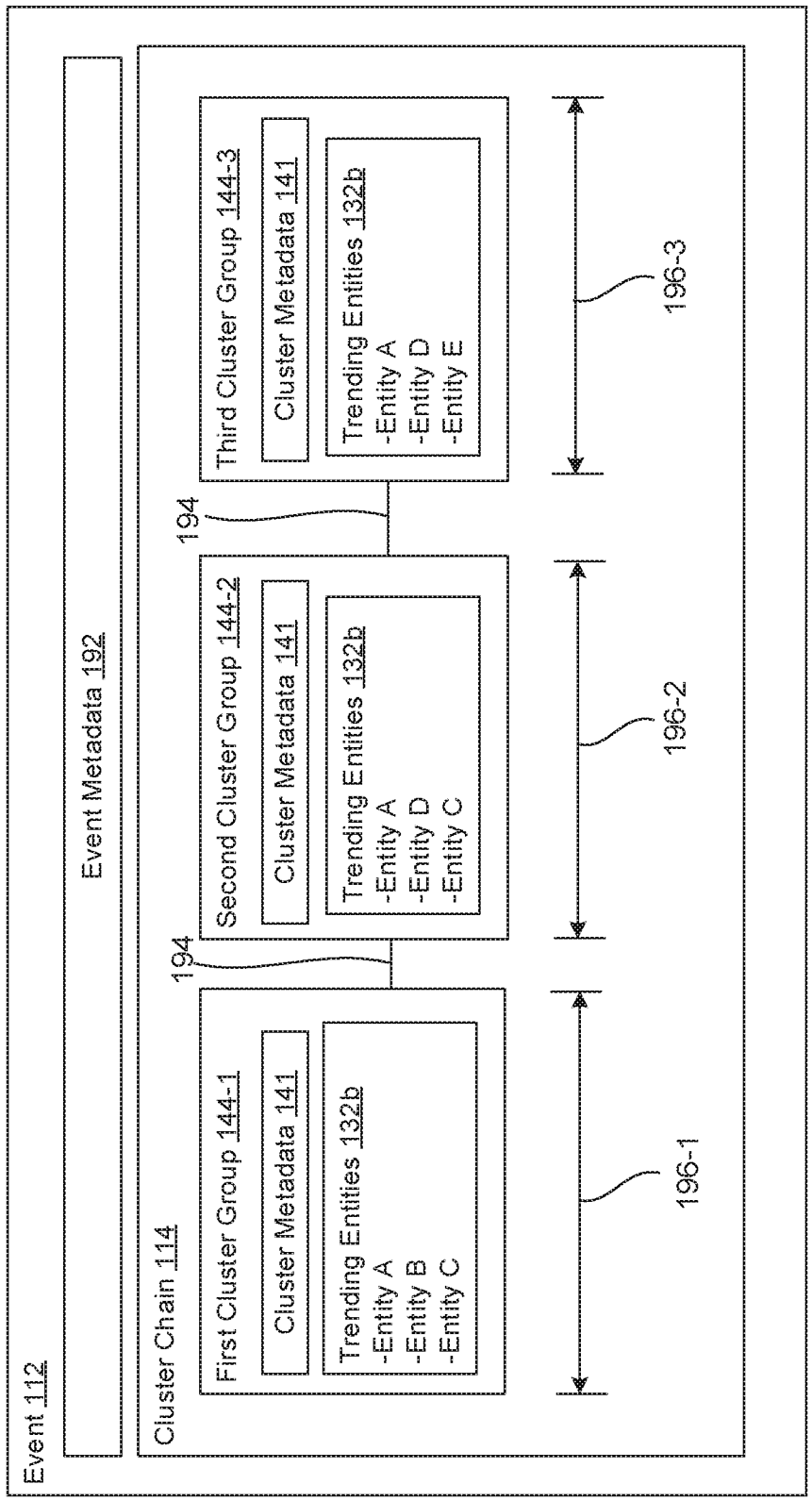
FIG. 1B illustrates an event represented by a cluster chain having a plurality of cluster groups over time according to an aspect.

For example, referring to FIG. 1B, the cluster chain 114 may include a first cluster group 144-1 of trending entities 132b (e.g., detected during a first period of time 196-1), a second cluster group 144-2 of trending entities 132b (e.g., detected during a second period of time 196-2), and a third cluster group 144-3 of trending entities 132b (e.g., detected during a third period of time 196-3). As shown in FIG. 1B, the second cluster group 144-2 is linked to the first cluster group 144-1, and the third cluster group 144-3 is linked to the second cluster group 144-2, which indicates that the first cluster group 144-1, the second cluster group 144-2, the third cluster group 144-3 relate to the same event 112. By continuously (e.g., periodically) detecting and linking cluster groups 144 over time (and in real-time or substantially real-time), terms that are used to describe the event 112 on the messaging system 100 at different points during the lifetime of the event 112 may be captured by the cluster chain 114.

For example, with respect to the example of the tsunami in Japan that occurred in March 2011, initially, this event was dominated by keywords such as earthquake and tsunami but later the event words such as nuclear and radiation were introduced. According to the techniques discussed herein, the messaging system 100 may account for the dynamic nature of event-based conversations occurring on the messaging system 100 by tracking the evolution of events 112, which would be able to identify not only the initial terms of earthquake and tsunami for the event 112 (e.g., earthquake and tsunami may be part of the first cluster group 144-1) but also the later introduced terms of nuclear and radiation as relating to the same event 112 (e.g., nuclear and radiation may be part of the third cluster group 144-3). As such, in contrast to some conventional approaches that use static event detection (e.g., detecting events from a snapshot of data), the event detection provided by the messaging system 100 is dynamic in order to account for the dynamic nature of what is discussed on the messaging system 100.

The messaging system 100 includes a messaging platform 104 executable by a server computer 102, and a client application 176 executable by a computing device 174. The client application 176 communicates with the messaging platform 104 to send (and receive) messages, over a network 172, to (and from) other users of the messaging platform 104. The client application 176 may be a social media messaging application in which users post and interact with messages. In some examples, the client application 176 is a native application executing on an operating system of the computing device 174 or may be a web-based application executing on the server computer 102 (or other server) in conjunction with a browser-based application of the computing device 174. The computing device 174 may access the messaging platform 104 via the network 172 using any type of network connections and/or application programming interfaces (APIs) in a manner that permits the client application 176 and the messaging platform 104 to communicate with each other.

The computing device 174 may be a mobile computing device (e.g., a smart phone, a PDA, a tablet, or a laptop computer) or a non-mobile computing device (e.g., a desktop computing device). The computing device 174 also includes various network interface circuitry, such as for example, a mobile network interface through which the computing device 174 can communicate with a cellular network, a Wi-Fi network interface with which the computing device 174 can communicate with a Wi-Fi base station, a Bluetooth network interface with which the computing device 174 can communicate with other Bluetooth devices, and/or an Ethernet connection or other wired connection that enables the computing device 174 to access the network 172.

The server computer 102 may be a single computing device or may be a representation of two or more distributed computing devices communicatively connected to share workload and resources. The server computer 102 may include at least one processor and a non-transitory computer-readable medium that stores executable instructions that when executed by the at least one processor cause the at least one processor to perform the operations discussed herein.

The messaging platform 104 is a computing platform for facilitating communication (e.g., real-time communication) between user devices (one of which is shown as computing device 174). The messaging platform 104 may store millions of accounts 118 of individuals, businesses, and/or entities (e.g., pseudonym accounts, novelty accounts, etc.). One or more users of each account 118 may use the messaging platform 104 to send messages to other accounts 118 inside and/or outside of the messaging platform 104. In some examples, the messaging platform 104 may enable users to communicate in "real-time", e.g., to converse with other users with minimal delay and to conduct a conversation with one or more other users during simultaneous sessions. In other words, the messaging platform 104 may allow a user to broadcast messages and may display the messages to one or more other users within a reasonable time frame (e.g., less than two seconds) to facilitate a live conversation between users. In some examples, recipients of a message may have a predefined graph relationship in a connection graph 116 with an account of the user broadcasting the message.

The connection graph 116 includes a data structure that indicates which accounts 118 in the messaging platform 104 are associated with (e.g., following, friends with, subscribed to, etc.) a particular account 118 and are, therefore, subscribed to receive messages from the particular account 118. For example, the connection graph 116 may link a first account with a second account, which indicates that the first account is in a relationship with the second account. The user of the second account may view messages posted on the messaging platform 104 by the user of the first account (and/or vice versa). The relationships may include unidirectional (e.g., follower/followee) and/or bidirectional (e.g., friendship). In some examples, the connection graph 116 may represent a user that has installed a client application 176 and set up a user account through the client application 176. The messages can be any of a variety of lengths which may be limited by a specific messaging system or protocol.

In some examples, users interested in viewing messages authored by a particular user can choose to follow the particular user. A first user can follow a second user by identifying the second user as a user the first user would like to follow. After the first user has indicated that they would like to follow the second user, the connection graph 116 is updated to reflect the relationship, and the first user will be provided with messages authored by the second user. Users can choose to follow multiple users. Users can also respond to messages and thereby have conversations with one another. In addition, users may engage with messages such as sharing (e.g., re-sharing) a message with their followers or favoritizing (or "liking") a message in which the engagement is shared with their followers.

The messaging platform 104 includes a timeline manager 163 configured to generate and transmit data (over the network 172) to render a timeline 180 of social content on a user interface 178 of the client application 176. In some examples, the timeline 180 includes a list (e.g., ranked list) of messages in chronological order (or reverse-chronological order). The list of messages may include messages posted by users on the messaging platform 104 having a relationship with the user of the client application 176 in the connection graph 116.

The messaging platform 104 includes a trends manager 106 configured to generate and transmit data (over the network 172) to render one or more trends 182 (e.g., also referred to as a trends section) in the user interface 178 of the client application 176. In some examples, the trends manager 106 communicates with a trend detector service 128 to identify trending entities 132a. The trend detector service 128 and the trending entities 132a are further described later in the disclosure. However, briefly, the trend detector service 128 may execute an algorithm to identify the trending entities 132a on the messaging platform 104, and the trends manager 106 may obtain the list of trending entities 132 and provide the list (or a portion thereof) to the client application 176, which is rendered as the trends 182 on the section of the user interface 178. In some examples, the trends 182 are tailored for the user of the client application 176, which may be based on the accounts 118 in which the user is following, interests of the user, and/or the location of the user. In some examples, the trends manager 106 may identify the topics that are currently popular to help the user discover emerging topics of discussion on the messaging platform 104.

The messaging platform 104 includes a search manager 161 that can execute a search query and transmit information (over the network 172) to enable the client application 176 to render search results 186 on the user interface 178 of the client application 176. For example, the search manager 161 may receive a query request from the client application 176 to search the message platform to find messages, people, hashtags, topics, photos, videos, etc. In response to the query request, the search manager 161 may provide the search results 186 (tailored to the one or more terms of the query request) on the user interface 178 of the client application 176.

The messaging platform 104 includes an event detector 120 configured to receive a message stream 108 and detect one or more events 112 based on the messages in the message stream 108. In some examples, an event 112 may reflect a significant thing being discussed on the messaging platform 104, and a significant thing is happening when a group of people are talking about it in a magnitude that is different from normal levels of a conversation about a matter (e.g., it is trending). In some examples, the event 112 represents a real-world event that is discussed on the messaging platform 104. In some examples, the event detector 120 executes a similarity-based temporal event detection algorithm (e.g., see Algorithm 1 provided below) to detect a particular event 112 as a cluster chain 114 of linked cluster groups 144 over time. The event detector 120 may track the event 112 over time by updating the cluster chain 114 with new cluster groups 144. As such, the event 112 may be represented differently over time, and the modeling of the event 112 as the cluster chain 114 reflects the fact that an eventful conversation can change over time. A detected event 112 corresponds to a cluster chain 114 and is characterized at a particular point in time by a cluster group 144 of trending entities 132b.

In some examples, the message stream 108 is a large (e.g., very large) stream of all the messages generated on the messaging platform 104. In some examples, as a user posts a message to the messaging platform 104, that message is added to the message stream 108. In some examples, the message stream 108 includes message delivered at a rate over 5 k messages per second. Over the course of the day, in some examples, the message stream 108 may include over five hundred million messages. In some examples, the message stream 108 includes messages delivered at a rate over 10 k messages per second. In some examples, the message stream 108 includes messages delivered at a rate over 25 k messages per second. In some examples, the message stream 108 includes messages delivered at a rate over 50 k messages per second. In some examples, the message stream 108 includes message creation events for messages created and posted on the messaging platform 104, message re-share events for existing messages that are re-shared on the messaging platform 104, and/or engagement events for existing messages that are favoritized or liked on the messaging platform 104. In some examples, a particular message exchanged on the messaging platform 104 has a character limit. In some examples, the character limit is two hundred and eighty characters.

Various factors and characteristics of social messaging platforms may make the detection of events (as they are occurring) to be relatively difficult. For example, the scale of the message stream 108 is relatively large (e.g., the messages in the message stream 108 may be over 5 k messages per second). Also, the messages may be relatively short, which may cause the semantic understanding of the underlying text to be relatively difficult given that messages are sometimes written in a unique conversational style particular to the brevity of the social media platform. Further, the message stream 108 may include a relatively high degree of noise, e.g., there may be many messages that are unrelated to events and even the ones that are related can include irrelevant terms. In addition, as indicated above, the events 112 discussed on the messaging platform 104 may be dynamic in nature, and therefore may change over time.

To address the above identified challenges, the event detector 120 may periodically apply clustering operations on the messages of a message stream 108 (e.g., on a minute-per-minute basis or other periodic time frame) and generate a dynamically updated list of events 112 (e.g., a dynamic updated list of cluster chains 114). For example, the event detector 120 may be considered a real-time event detection system that receives the full message stream 108 and identifies cluster groups 144 of trending entities 132b on a periodic basis (e.g., minute-by-minute time interval or other periodic time frame). The event detector 120 may link these cluster groups 144 into cluster chains 114 as the event 112 progresses over time, thereby tracking the cluster chains 114 in real-time. For example, the event detector 120 may model an event 112 as a cluster chain 114, where a cluster chain 114 includes two or more cluster groups 144 that are linked together, and each cluster group 144 includes two or more trending entities 132*b*.

Generally, an event 112 may be represented by a group of entities that people use to discuss the event 112 on the messaging system 100. For example, an event 112 for a film awards show can be represented by entities such as the nominated actors, actresses, and films that are being discussed. However, according to the techniques discussed herein, since the event-based conversation can change over time, the event 112 is modeled as the cluster chain 114, e.g., a list of cluster groups 144 of trending entities 132*b* (e.g., indexed in time order). A detected event 112 corresponds to a cluster chain 114 and is characterized at a particular point in time by a cluster group 144 of trending entities 132*b*.

For example, referring to FIG. 1B, the event detector 120 may receive the message stream 108 and detect a first cluster group 144-1 of trending entities 132*b* from a first period of time 196-1 and may detect a second cluster group 144-2 of trending entities 132*b* from a second period of time 196-2. Then, if the event detector 120 determines that the first and second cluster groups 144-1, 144-2 relate to the same event 112, the messaging system 100 may link these two cluster groups 144 to form the cluster chain 114. At a particular time within the first period of time 196-1, the event 112 may be characterized by the trending entities 132*b* of the first cluster group 144-1, which (continuing with the above example) may include earthquake and tsunami. At a particular time within the second period of time 196-2, the event 112 may be characterized by the trending entities 132*b* of the second cluster group 144-2, which (continuing with the above example) may include nuclear and radiation. However, since the first cluster group 144-1 and the second cluster group 144-2 are linked within the cluster chain 114, these terms (e.g. entities) relate to the same event 112 despite the changing nature of the event-based conversation.

The event detector 120 includes a burst detector 126 and a cluster chain detector 136. The burst detector 126 may receive the message stream 108 and execute burst detection operations on the messages of the message stream 108 to identify trending entities 132*b* from the message stream 108. The cluster chain detector 136 may execute clustering operations on the trending entities 132*b* to detect the cluster groups 144 and form the cluster chains 114, which are stored in a memory device 110.

In some examples, the burst detector 126 is a component (or module) separate (or distinct) from the cluster chain detector 136, where the burst detector 126 and the cluster chain detector 136 can be independently scaled. In some examples, the burst detector 126 includes a trend detector service 128 and an entity detector 130. In some examples, the burst detector 126 includes the trend detector service 128, and the entity detector 130 is included as part of the cluster chain detector 136.

In some examples, the burst detector 126 and the cluster chain detector 136 are executable by separate CPUs and memory devices. In addition, by separating the burst detection (e.g., performed by the burst detector 126) from the clustering operations (e.g., performed by the cluster chain detector 136), the burst detector 126 may execute one or more of its functions in parallel with the functions of the cluster chain detector 136, which may increase the speed of event detection (e.g., especially for social media platforms that handle a large amount of data). For instance, instead of sequentially performing the clustering operations after the burst detection, the configuration of the event detector 120 may allow the burst detector 126 to execute in parallel (e.g., at least partially in parallel) with the execution of the cluster chain detector 136.

In some examples, the messaging platform 104 includes a computing resource monitor 165 configured to monitor the computing resources assigned to the burst detector 126 and the cluster chain detector 136 and to dynamically increase (or decrease) the amount of computing resources assigned to the burst detector 126 and the cluster chain detector 136 in order to enable relatively fast event detection (e.g., in real-time or near real-time) for a relatively large message stream 108. In some examples, the computing resource monitor 165 may monitor the CPU utilization and/or memory usage of the burst detector 126. If the CPU utilization and/or memory usage of the burst detector 126 is above a threshold level (e.g., which may be caused by a sudden increase in the size of the message stream 108), the computing resource monitor 165 may cause the allocation of additional computing resources to the burst detector 126. In addition, the computing resource monitor 165 may separately monitor the CPU utilization and/or memory usage of the cluster chain detector 136. If the CPU utilization and/or memory usage of the cluster chain detector 136 is above a threshold level, the computing resource monitor 165 may cause the allocation of additional computing resources to the cluster chain detector 136. By using independently scalable components for the burst detector 126 and the cluster chain detector 136, the messaging platform 104 may increase the speed of event detection and increase the flexibility of the messaging platform 104 to adjust to the varying processing loads of burst detection and entity clustering, and to enable the tracking of events 112 in real-time.

The trend detector service 128 may receive the message stream 108 and compute trending entities 132*a* in real-time. A trending entity 132*a* may be an entity that appears in the message stream 108 at an unusually high rate or at a rate above a threshold condition, where the entity is a tag for content in a message of the message stream 108. In some examples, the trending entity 132*a* is content within a message that refers to a specific object. In some examples, the trending entity 132*a* may be a word (or words), a phrase, a hashtag, an identifier (e.g., user identifier, message identifier, etc.), a web resource (e.g., URL), and/or any content that refers to a specific object. In some examples, the trending entities 132*a* include named entities, hashtags, identifiers (e.g., user identifiers, message identifiers), and URLs. In some examples, the trend detector service 128 is a separate service that can be used by various components of the messaging platform 104. In some examples, the trend detector service 128 identifies trending entities 132*a* across in real-time geographical regions.

In some examples, the trend detector service 128 may define one or more domains, where each domain is a subset of the message stream 108, and the trend detector service 128 may define a velocity graph for a respective domain (e.g., the number of messages on the x-axis and time on the y-axis). The trend detector service 128 may define a threshold number of messages over a period of time (e.g., a spike) to detect the trending entities 132*a*.

In some examples, the trend detector service 128 may execute a series of process operations to identify the trending entities 132*a*, which may include data preparation, entity extraction, domain extraction, counting, scoring, and ranking, where the top scoring trends per domain are persisted in memory at the trend detector service 128 and available to be queried by other services of the messaging platform 104 such as the trends manager 106, the entity detector 130, and/or the cluster chain detector 136. The data preparation operation may include removing messages with low text quality or sensitive content and removing similar messages to substantially ensure that contribution to a trend from a single user is limited. The entity, domain extraction and counting operations may include, for a given message, extracting available entities and geographical domains, and for every domain and entity, the trend detector service 128 may emit a count with a tuple of <entity, domain, 1> and aggregate this information over time. The scoring operation may include scoring based on anomaly detection, where the trend detector service 128 computes expected <entity, domain> counts and compares the expected counts with observed counts to generate a score for each pair. To calculate expected count for a domain and entity pair, the trend detector service 128 may use the following equation:

$$E(d,\ e) = \frac{N_s(d)}{N_l(d)} \cdot N_1(d,\ e).$$ Eq. (1)

In Eq. (1), E(d, e) is expected count for domain d and entity e, $N_l$ is counted over a long time window and $N_s$ is counted over a short window. The ranking operation may include determining the top scoring trends per domain, and the top scoring trends per domain are persisted to memory at the trend detector service 128 and available to be queried.

The entity detector 130 may periodically query the trend detector service 128 to obtain the trending entities 132a and then store (e.g., cache) the trending entities 132a at the entity detector 130. In some examples, the entity detector 130 periodically queries the trend detector service 128 on a minute-by-minute basis or other period time interval. In some examples, the entity detector 130 may query the trend detector service 128 on a periodic basis faster than minute-by-minute such as every 30 seconds or every 15 seconds or slower than minute-by-minute such as every two minutes or every five minutes.

In some examples, the entity detector 130 may communicate with the trend detector service 128 over a server communication interface. In some examples, the entity detector 130 may obtain the trending entities 132a from the trend detector service 128 via one or more application programming interface(s). In some examples, the entity detector 130 may transmit a remote procedure call (RPC) (e.g., a thrift call) to the trend detector service 128 and then receive the trending entities 132a from the trend detector service 128. In some examples, the entity detector 130 obtains the trending entities 132a from a database, and the database is written to by the trend detector service 128. In some examples, the entity detector 130 may transmit a representational state transfer (REST) request to the trend detector service 128 and then receive the trending entities 132a from the trend detector service 128. In some examples, the entity detector 130 communicates with the trend detector service 128 via a GraphQL request.

The entity detector 130 receives the message stream 108 and extracts entities 132 from the message stream 108. For example, the entity detector 130 may extract certain types of terms included in the messages of the message stream 108, and these types of terms may be referred to as entities 132. In some examples, an entity 132 extracted by the entity detector 130 is content within a message that refers to a specific object. In some examples, an entity 132 extracted by the entity detector is a word (or words), a phrase, a hashtag, an identifier (e.g., user identifier, message identifier, etc.), a web resource (e.g., URL), and/or any content that refers to a specific object.

Figure 1C:
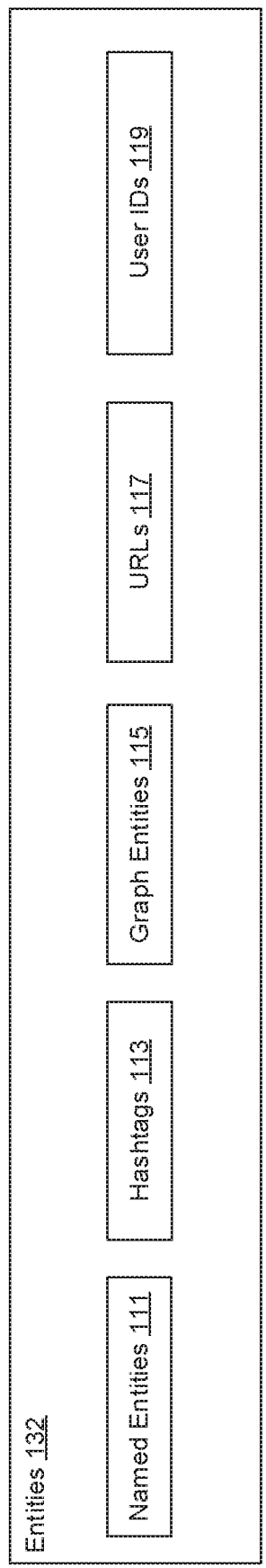
FIG. 1C illustrates various examples of entities that are extracted by the event detector according to an aspect.

In some examples, referring to FIG. 1C, the entities 132 include named entities 111 (e.g., "Oprah Winfrey"), hashtags 113 (e.g., "#UsOpen"), graph entities 115 (e.g., "entity 123"), URLs 117, and/or user identifiers 119. In information extraction, a named entity 111 may be real-world objects such as persons, locations, organizations, products, etc. A named entity 111 can be abstract or have a physical existence. Examples of named entities 111 include Barack Obama or New York City or anything else that can be named. For example, considering the following sentence, "Barack Obama was the president of the United States", both "Barack Obama" and the "United States" are named entities 111 since they refer to specific objects, but "president" may not be considered a named entity 111 since it can be used to refer to many different objects. A hashtag 113 is a word or unspaced phrase in a message introduced by an octothorpe symbol (#). The graph entities 115 represent the knowledge graph entities of the messaging platform 104. In some examples, the graph entities 115 include internal representations of entities captured through a knowledge graph. The user identifiers 119 may be the user or account identifiers that identify the accounts 118.

The entity detector 130 may use the trending entities 132a (received from the trend detector service 128) to filter out non-trending entities from the entities 132 in order to obtain the trending entities 132b. In some examples, the trending entities 132b include one or more of the type of entities 132 identified in FIG. 1C (or all of the types), but since the non-trending entities are filtered out, the trending entities 132b include the entities 132 that are trending. In some examples, the trending entities 132a identified by the trend detector service 128 include a larger collection of tags than the ones identified by the entity detector 130. For example, the trending entities 132a may include the named entities 111, the hashtags 113, the graph entities 115, the URLs 117, and the user identifiers 119 while the entities 132 identified by the entity detector 130 include the named entities 111, the hashtags 113, and the graph entities 115. As such, if a particular user identifier 119 has been identified by the trend detector service 128 as trending, the entity detector 130 would not extract that user identifier 119 because the entity detector 130 extracts only the named entities 111, the hashtags 113, and the graph entities 115. In some examples, the entities 132 (and consequently the trending entities 132b) are extended to also include the URLs 117 and the user identifiers 119.

The cluster chain detector 136 may receive the trending entities 132b from the burst detector 126 and generate the cluster chain 114 of linked cluster groups 144 over time, where the cluster chain 114 represents a single event 112 over time. The cluster chain 114 generated by the cluster chain detector 136 may be stored in the memory device 110. For example, the cluster chain detector 136 may continually (e.g., periodically) detect cluster groups 144 of trending entities 132b over time. For example, the cluster chain detector 136 may detect one or more cluster groups 144 during a first period of time, detect one or more cluster groups 144 during a second period of time, detect one or more cluster groups 144 during a third period of time, and so forth. In some examples, the cluster chain detector 136 detects one or more cluster groups 144 on a periodic basis (e.g., every minute). A particular cluster group 144 may include two or more trending entities 132b that are determined to be similarly related to each other in a certain time interval (e.g., trending entities 132b from the same cluster group 144 may be considered to semantically refer to the same subject matter). In some examples, the trending entities 132b of a particular cluster group 144 may share a common characteristic.

The cluster chain detector 136 may execute any type of community-based clustering algorithm to detect the cluster groups 144, which may or may not include a Louvain algorithm and similarity graphs. Then, the cluster chain detector 136 may link one or more cluster groups 144 from a current time period to one or more cluster groups 144 from a previous time period to generate the cluster chain 114.

In further detail, the cluster chain detector 136 includes an entity clustering engine 138, a similarity graph generator 148, a similarity calculator 152, a similarity graph filter 162, a cluster linker 168, and a cluster ranker 170. In some examples, the cluster chain detector 136 does not include the similar graph generator 148 (e.g., a similarity graph 146 is not generated). The similarity calculator 152 may receive the trending entities 132b and compute similarity values 150 for the trending entities 132b based on frequency count 154 and co-occurrences 156 over a time window 158. For example, the similarity calculator 152 may track the trending entities' frequency count 154 and co-occurrences 156 over a time window 158. The time window 158 is used for the aggregation of co-occurrences 156 and frequency count 154 as further explained below. In some examples, the time window 158 is a sliding time window. In some examples, the time window 158 may be adjusted for memory reduction.

The similarity calculator 152 may use the frequency count 154 and the co-occurrences 156 over the time window 158 to compute the similarities between the trending entities 132b, where a respective similarity value 150 represents a level of similarity between two trending entities 132b. In some examples, a similarity value 150 is represented by or considered an edge weight. Table 1 illustrates an example of three messages from the message stream 108.

TABLE 1

| Message ID | Text |
|---|---|
| 1 | iphone ™ released during #appleevent |
| 2 | Tim Cook presents the new iphone ™ #appleevent |
| 3 | Tim Cook unveiled the iphone ™ |

The similarity calculator 152 may represent the co-occurrences 156 as shown in Table 2. In this example, the trending entities 132b include Iphone™ (e.g., a named entity 111) and #appleevent (e.g., a hashtag 113).

TABLE 2

| | Message 1 | Message 2 | Message 3 |
|---|---|---|---|
| iphone ™ | 1 | 1 | 1 |
| #appleevent | 1 | 1 | 0 |

The similarity calculator 152 may compute entity vectors for the trending entities 132b (e.g., Iphone™ and #appleevent), as follows: Iphone™=[1, 1, 1], #appleevent= [1, 1, 0]. In some examples, when computing a similarity value 150 for a pair of trending entities 132b, the similarity calculator 152 may compute the similarity value based on cosine similarity. The cosine similarity for two entities X and Y is shown in Eq. (2):

$$\cos(X, Y) = \frac{X \cdot Y}{\|X\| \|Y\|} \quad \text{Eq. (2)}$$

In the above example, for the trending entities 132b of Iphone™ and #appleevent, the similarity calculator 152 may compute the similarity value 150 as follows: cos(Iphone™, #applevent)=0.81649. Although this example uses cosine similarity, the similarity calculator 152 may use any type of similarity analysis that uses the frequency count 154 and the co-occurrences 156 over a time window 158 or any similarity analysis that can compute the similarity distance (or the level of similarity) between two entities.

Figure 1D:
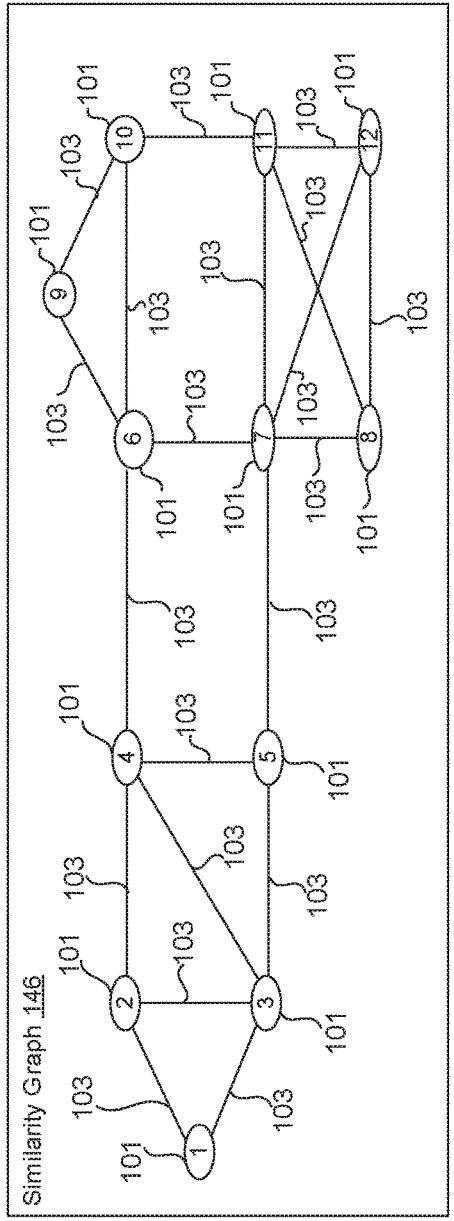
FIG. 1D illustrates a similarity graph having nodes representing trending entities and edges representing similarity values according to an aspect.

The similarity graph generator 148 may generate a similarity graph 146 based on the trending entities 132b and their corresponding similarity values 150. FIG. 1D illustrates a similarity graph 146 according to an aspect. The similarity graph 146 includes nodes 101 (e.g., nodes 1 through 12) representing the trending entities 132b and edges 103 representing the links between nodes 101. Each edge 103 is associated with an edge weight, which is the similarity value 150 computed by the similarity calculator 152.

The similarity graph filter 162 may filter the similarity graph 146 based on a similarity threshold 160 such that edges 103 having similarity values 150 less than the similarity threshold 160 are removed from the similarity graph 146. In some examples, the similarity threshold 160 is the lower limit for the similarity of two data records that belong to the same cluster. For example, if the similarity threshold 160 is set to 0.25, data records with field values that are less than 25% similar are unlikely to be assigned to the same cluster. In some examples, the similarity threshold 160 has a range from 0 to 1. The similarity threshold 160 may be a minimum threshold that is used to apply to the edge weights (e.g., similarity values 150) of the similarity graph 146 (e.g., edges 103 having similarity values 150 less than the similarity threshold 160 are removed). For example, the similarity graph filter 162 may filter the similarity graph 146 using the similarity threshold 160 (e.g., a minimum similarity threshold) in order to remove noisy connections between the trending entities 132b. If the similarity value 150 of an edge 103 is below the similarity threshold 160, the similarity graph filter 162 may remove that edge 103 from the similarity graph 146.

The entity clustering engine 138 may apply a clustering algorithm 140 on the similarity graph 146 to detect the cluster groups 144. The entity clustering engine 138 may execute the clustering algorithm 140 to partition the similarity graph 146 to detect the cluster groups 144. In some examples, the clustering algorithm 140 includes any type of community-based clustering algorithm. In some examples, the clustering algorithm 140 includes a sim clustering algorithm configured to compare and contrast entities to identify groups of topically-related entities. In some examples, the clustering algorithm 140 includes a modularity-based graph partitioning algorithm. In some examples, the clustering algorithm 140 includes a Louvain clustering algorithm. In some examples, the clustering algorithm 140 is a machine-learning-based algorithm defining a neutral network. In some examples, the clustering algorithm 140 includes any type of connectivity-based clustering algorithm (e.g., hierarchical clustering algorithm), centroid-based clustering algorithm, distribution-based clustering algorithm, and/or density-based clustering algorithm. For relatively large networks, in some examples, the Louvain clustering algorithm may be efficient to determine cluster groups 144. In some examples, the clustering algorithm 140 is associated with a resolution 142. The resolution 142 may be a parameter of the clustering algorithm 140, e.g., a Louvain clustering algorithm. The resolution 142 may be a parameter that affects the size of the recovered clusters. A larger value of the resolution 142 may result in many smaller communities, and a smaller value of the resolution 142 may result in a few larger communities.

Figure 1E:
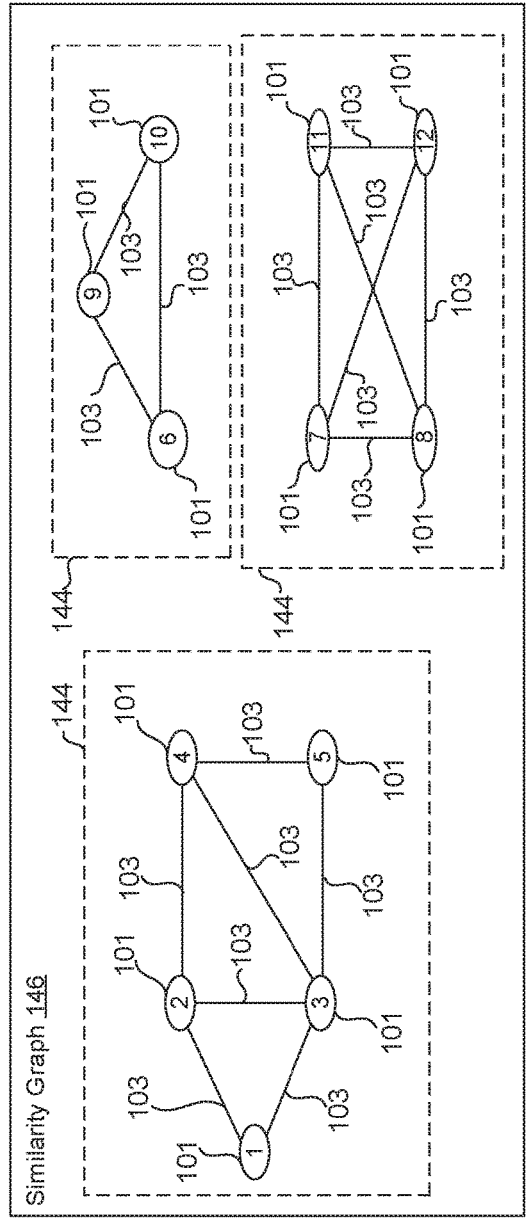
FIG. 1E illustrates a filtered similarity graph that has been partitioned into a plurality of cluster groups according to an aspect.

FIG. 1E may depict the similarity graph 146 after filtering and clustering for a particular period of time according to an aspect. For example, the similarity graph 146 may depict the cluster groups 144 for the first cluster group 144-1 of FIG. 1B. Referring to FIGS. 1D and 1E, the edge 103 between node 4 and node 6, the edge 103 between node 5 and node 7, the edge 103 between node 6 and node 7, and the edge 103 between node 10 and node 11 have been removed by the similarity graph filter 162. Then, in response to the application of the clustering algorithm 140, the entity clustering engine 138 may detect the cluster groups 144, where each cluster group 144 includes two or more trending entities 132b (represented by the nodes 101). In some examples, the cluster groups 144 depicted in FIG. 1E illustrate the cluster groups 144 for a particular period of time, e.g., either the first period of time 196-1, the second period of time 196-2, or the third period of time 196-3. Then, during a subsequent period of time (e.g., the next minute), the entity clustering engine 138 may receive the trending entities 132b exchanged on the messaging platform 104 during that subsequent period of time and detect one or more cluster groups 144.

The cluster linker 168 may link one of more cluster groups 144 from one period of time with one or more cluster groups 144 from a previous period of time to develop the cluster chain 114. For example, after the entity clustering engine 138 applies the clustering algorithm 140 to produce cluster groups 144 for a given time period $C_T$ (e.g., given minute), the cluster linker 168 may link to the cluster groups 144 from the previous time period $C_{T-1}$ (e.g., previous minute). In some examples, the cluster linker 168 may link the cluster groups 144 based on a number of trending entities 132b shared between a cluster group 144 from one period of time and a cluster group 144 from the previous period of time.

Referring back to FIG. 1B, an event 112 may be represented as a cluster chain 114 having a first cluster group 144-1, a second cluster group 144-1, and a third cluster group 144-3. The event 112 (or the cluster chain 114) may include or be associated with event metadata 192. The event metadata 192 may include detected start time and end time of the event 112. In some examples, each cluster group 144 may include or be associated with cluster metadata 141. In some examples, the cluster metadata 141 may include entity frequency count of the trending entities 132b defined by a respective cluster group 144. In some examples, the cluster metadata 141 may include the frequency count 154 for each of the trending entities 132b of a respective cluster group 144. In some examples, the cluster metadata 141 may include the total number of frequency count 154 across all of the trending entities 143 of a respective cluster group 144. In some examples, the cluster metadata 141 may include the number of co-occurrences 156 for each trending entity 132b or across all of the trending entities 132b of a respective cluster group 144. In some examples, the cluster metadata 141 may include the cluster identifier 166 of a respective cluster group 144.

The first cluster group 144-1 is associated with a first period of time 196-1, the second cluster group 144-2 is associated with a second period of time 196-2, and the third cluster group 144-3 is associated with a third period of time 196-3. The second period of time 196-2 may occur after the first period of time 196-1, and the third period of time 196-3 may occur after the second period of time 196-2. Although each of the period of times depict one cluster group 144, the first period of time 196-1, the second period of time 196-2, and the third period of time 196-3 may include multiple cluster groups 144 (e.g., as shown in FIG. 1E). In some examples, each of the first period of time 196-1, the second period of time 196-2, and the third period of time 196-3 has the same temporal length (e.g., each has a temporal length of a minute). However, the embodiments may encompass any periodic time interval to link cluster groups 144. The first cluster group 144-1 includes trending entities 132b from the first period of time 196-1 (e.g., Entity A, Entity B, Entity C), the second cluster group 144-2 includes trending entities 132b from the second period of time 196-2 (e.g., Entity A, Entity D, Entity C), and the third cluster group 144-3 includes trending entities 132b from the third period of time 196-3 (e.g., Entity A, Entity D, Entity E).

If the cluster linker 168 determines that the second cluster group 144-2 is related to the first cluster group 144-2, the cluster linker 168 generates a link 194 between the first cluster group 144-2 and the second cluster group 144-2. Similarly, if the cluster linker 168 determines that the third cluster group 144-3 is related to the second cluster group 144-2, the cluster linker 168 generates a link 194 between the second cluster group 144-2 and the third cluster group 144-3. As shown in FIG. 1B, the event 112 is represented over time (e.g., across the first period of time 196-1, the second period of time 196-2, and the third period of time 196-3) by linking the cluster groups 144 from the different time periods. As shown in FIG. 1B, during the second period of time 196-2, the trending entity 132b of "Entity D" was introduced (and during the third period of time 196-3, the trending entity 132 of "Entity E" was introduced), but using the techniques described herein, the event detector 120 may detect those later introduced terms as relating to the same event 112 as the trending entities 132b of the first cluster group 144-1 since the event 112 is modeled as a list of cluster groups 144 over time.

The link 194 between the second cluster group 144-2 and the first cluster group 144-1 indicates that the first cluster group 144-1 and the second cluster group 144-2 relates to the same event 112. Also, as shown in FIG. 1B, the cluster chain 114 has a link 194 between the third cluster group 144-3 and the second cluster group 144-2, which indicates that the first cluster group 144-1, the second cluster group 144-2, and the third cluster group 144-3 are related to the same event 112.

In some examples, the link 194 is an edge weight representing a level of similarity between the first cluster group 144-1 and the second cluster group 144-2. In some examples, the edge weight is a measure of the number of trending entities 132b that are shared between the first cluster group 144-1 and the second cluster group 144-2. In some examples, the edge weight is similar or the same as the edge weight (e.g., the similarity value 150) with respect to the similarity graph generator 148. In some examples, if the edge weight associated with the link 194 is below a threshold value, the link 194 is removed. In some examples, the cluster linker 168 determines the link 194 between the first cluster group 144-1 and the second cluster group 144-2 based on a maximum weighted bipartite matching. In some examples, the maximum weighted bipartite matching includes an optimization problem to find a maximum-weight matching.

In some examples, the cluster linker 168 is configured to generate a bipartite graph, where the cluster groups 144 from the given period of time $C_T$ are connected to the cluster groups 144 from the previous time period $C_{T-1}$. A bipartite graph (e.g., G=(U, V, E)) is a graph whose vertices can be divided into two disjoint sets U and V such that each edge $(u_i, v_j) \in E$ connects a vertex $u_i \in U$ and one $v_j \in V$. If each edge in graph G has an associated weight $w_{ij}$, the graph G is called a weighted bipartite graph. In a bipartite graph, a matching M of graph G is a subset of E such that no two edges in M share a common vertex. If the graph G is a weighted bipartite graph, the maximum weighted bipartite matching is a matching who sums of the weights of the edges is maximum. The edge weight between them may be a measure of how many entities these cluster groups 144 share, similar to the cosine similarity described earlier. The cluster linker 168 may filter out any edges whose weight falls below a threshold and perform maximum weighted bipartite matching to find cluster links.

In some examples, when a cluster group 144 is successfully linked, the cluster linker 168 may copy the cluster identifier 166 from the cluster group 144 of the previous time period onto the cluster group 144 in the given time period. For any cluster groups 144 that are not linked, the cluster linker 168 may generate a new, unique cluster identifier 166. For example, if the first cluster group 144-1 is not linked to a cluster group 144 from a previous time period, the cluster linker 168 may assign a cluster identifier 166 (e.g., a new, unique identifier) to the first cluster group 144-1. Since the second cluster group 144-2 is linked to the first cluster group 144-1 (via the link 194), the cluster linker 168 may assign the same cluster identifier 166 that was assigned to the first cluster group 144-1 to the second cluster group 144-2. Similarly, since the third cluster group 144-3 is linked to the second cluster group 144-2, the cluster linker 168 may assign the same cluster identifier 166 that was assigned to the second cluster group 144-2 to the third cluster group 144-3. As such, in some examples, the cluster identifier 166 may be the same for each of the cluster groups 144 within a particular cluster chain 114.

The cluster ranker 170 may rank the cluster groups 144 within the cluster chain 114. For example, with respect to the cluster chain 114 of FIG. 1B, the cluster ranker 170 may determine a ranked list of the first cluster group 144-1, the second cluster group 144-2, and the third cluster group 144-3. In some examples, the cluster ranker 170 may rank the cluster groups 144 based on the aggregate popularity metric of the trending entities 132b contained within a respective cluster group 144. For example, with respect to the first cluster group 144-1, the cluster ranker 170 may identify a popularity metric associated with each of tending entities 132b associated with the first cluster group 144-1, and then aggregate the popularity metrics to obtain an overall (aggregate popularity metric). The cluster ranker 170 may perform the same operations with respect to the second cluster group 144-2 and the third cluster group 144-3. Then, the cluster ranker 170 may rank the first cluster group 144-1, the second cluster group 144-2, and the third cluster group 144-3 according to their overall popularity score.

The event detector 120 may store the cluster chain 114 in the memory device 110. For example, the event detector 120 may stored the ranked list of cluster groups 144 in the memory device 110 so that the cluster chain 114 (or portions thereof) can be retrieved by the cluster chain detector 136 for future linking steps or can be retrieved by one or more other services provided by the messaging platform 104.

The messaging platform 104 may transmit digital data 190 (over the network 172) to the client application 176 to render information about the event(s) 112 in the user interface 178 of the client application 176. The information about the event(s) 112 may include cluster chain information 184. The cluster chain information 184 may identify one or more events 112 and identify one or more trending entities 132b from one or more cluster groups 144 over time. In some examples, the cluster chain information 184 is incorporated into the trends 182. For example, the trends 182 may identify a list of trending topics including trending hashtags. In one particular example, the hashtag "#bucks" may be trending and be included as part of an event 112. In some examples, the trends manager 106 may receive the cluster chains 114 and determine whether to identify one or more related terms associated with the event 112. The hashtag "#bucks" may be included as part of the first cluster group 144-1, and another term ("Giannis") may be included as part of the second cluster group 144-2. The trends manager 106 may use the cluster chain 114 for that event 112 to identify the entity (Giannis) and indicate the entity (Giannis) as a related term for the trending hashtag of "#bucks."

In some examples, the cluster chain information 184 is incorporated as part of the user's timeline 180. For example, the timeline manager 163 may receive the cluster chains 114 and determine whether any of the messages to be rendered in the user's timeline 180 includes trending entities 132b within the cluster chains 114. If so, the timeline manager 163 may identify other trending entities 132b from the same cluster group 144 or trending entities 132b from other cluster groups 144 that are part of the same cluster chain 114.

The timeline 180 may include a stream of messages that includes a list of messages posted by accounts 118 having a relationship with the account 118 of the user of the client application 176 in the connection graph 116. In some examples, the stream of messages included as part of the timeline 180 is ranked, and the ranking of the messages may be based (in part) on the detected event 112. For example, as discussed with reference to FIG. 1B, the event 112 may include event metadata 192 that identifies the detected start time of the event 112 and the detected end time of the event 112. The detected start time may be based on the time associated with the first cluster group 144 of the cluster chain 114, and the detected end time may be based on the time associated with the last cluster group 144 of the cluster chain 114. The timeline manager 163 may receive the event 112, which identifies the trending entities 132b across the different cluster groups 144 that belong to that event 112 (or cluster chain 114). The timeline manager 163 may determine whether a message to be rendered as part of the user's timeline 180 includes a trending entity 132b from the cluster chain 114 during the duration of the event 112 (e.g., between the detected start time and the detected end time). If that message includes a trending entity 132b that is part of the cluster chain 114 during the duration of the event 112, the timeline manager 163 may boost (or up-rank) that message within the ranking of the user's timeline 180.

In some examples, the timeline 180 includes promoted content, which may include advertisement messages. Similar to messages to be delivered according to the connection graph 116, a promoted message may be boosted in the timeline's ranking if that promoted message includes a trending entity 132 from the cluster chain 114 during the event's duration. In some examples, the messaging platform 104 includes an advertisement stack engine configured to determine pricing for promoted messages. In some examples, the advertisement stack engine may increase its pricing for promoted content if the promoted content includes one or more trending entities 132 during the duration of the event 112.

In some examples, the cluster chain information 184 is incorporated as part of the search results 186. For example, a user may submit a query search, and the search manager 161 may use the cluster chains 114 to expand the search results 186 to include other related entities. For example, in response to a query for #bucks, the search manager 161 may obtain the list of events 112, and if the term #bucks is associated with an event 112, the search manager 161 may return messages that include the term #bucks and may identify a suggested term (e.g., another trending entity 132b from the same cluster chain 114) or return search results that include messages having other trending entities 132b associated with the term #bucks.

Figure 2:
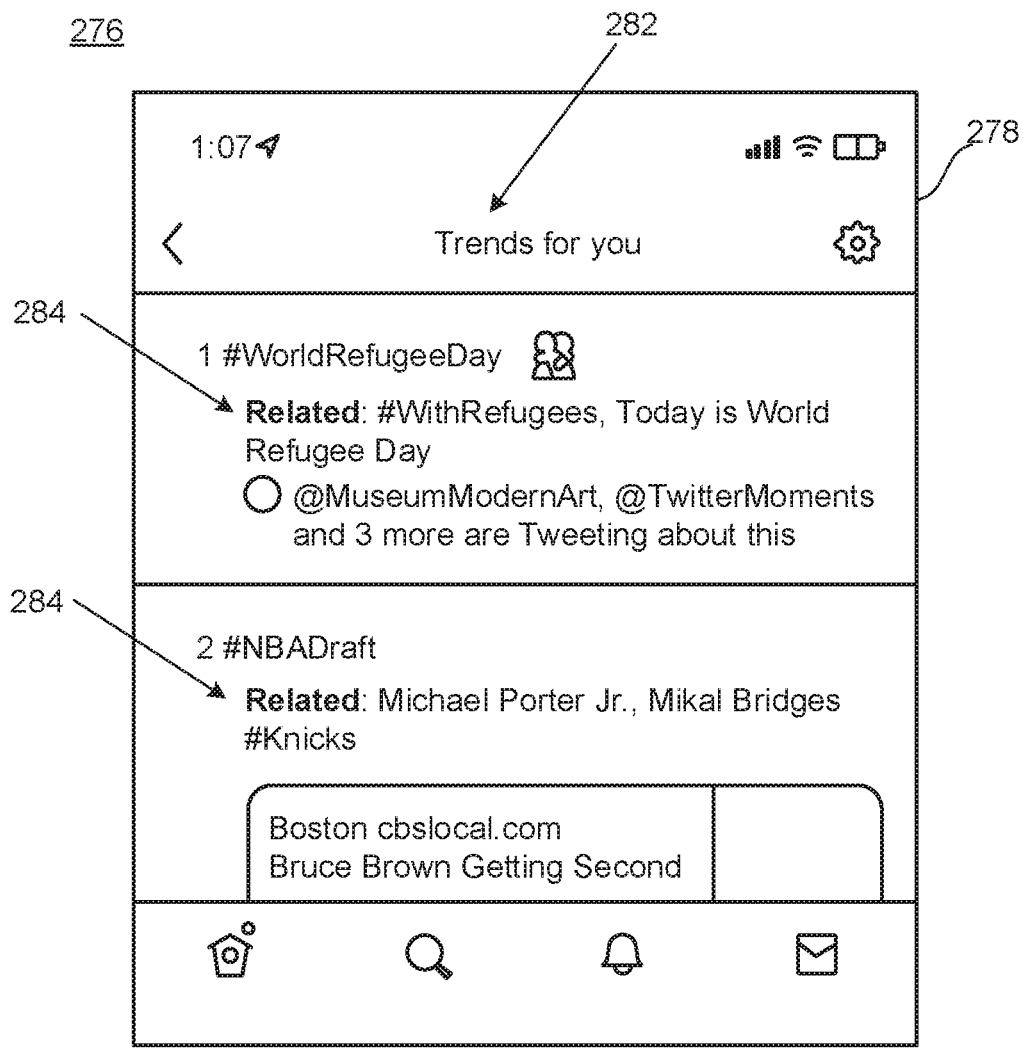
FIG. 2 illustrates an example screenshot of a client application that renders information from the cluster chain according to an aspect.

FIG. 2 illustrates an example of a user interface 278 of a client application 276 depicting cluster chain information 284 within a trends section 282 of the client application 276. The trends section 282 displays a list of trending entities, e.g., #WorldRefugeeDay, and #NBADraft. With respect to one or more entities identified on the trends section 282, the client application 276 renders a related line (e.g., the cluster chain information 284) that identifies one or more related entities (e.g., determined from the cluster chains 114). For example, the cluster chain information 284 identifies several trending entities (e.g., trending entities 132b) (e.g., "#WithRefugees", "Today is World Refugee Day") that are included as part of the same cluster chain 114.

Figure 3:
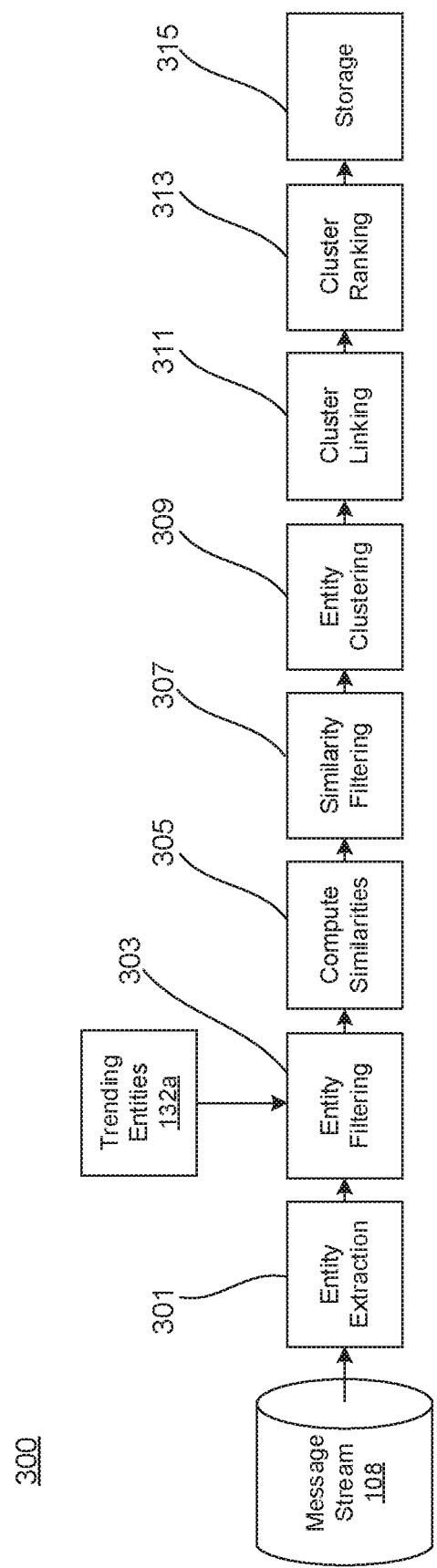
FIG. 3 illustrates a process flow depicting example operation of an event detector according to an aspect.

FIG. 3 illustrates a process flow 300 for similarity-based temporal event detection according to an aspect. The process flow 300 is described with respect to the messaging system 100 of FIGS. 1A through 1E and may include any of the details discussed with reference to those figures. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

In operation 301, entity extraction is performed by the event detector 120. For example, the entity detector 130 receives the message stream 108 and exacts the entities 132 from the messages of the message stream 108. In some examples, the entities 132 include the named entities 111 and the hashtags 113. In some examples, the entities 132 include the named entities 111, the hashtags 113, the graph entities 115, the URLs 117, and/or the user identifiers 119.

In operation 303, entity filtering is performed by the event detector 120. For example, the entity detector 130 communicates with the trend detector service 128 to obtain the trending entities 132a. The entity detector 130 may use the trending entities 132a received from the trend detector service 128 to filter out any non-trending entities from the entities 132 to obtain a list of trending entities 132b.

In operation 305, similarities are computed by the event detector 120. For example, the similarity calculator 152 is configured to compute a similarity value 150 for pairs of trending entities 132b. For example, the similarity calculator 152 receives the trending entities 132b and tracks their frequency count 154 and co-occurrences amongst them over a time window 158. The similarity calculator 152 uses the frequency counts 154 and the co-occurrences 156 to compute the similarity values 150 between trending entities 132b. In some examples, the similarity calculator 152 computes the cosine similarity for two trending entities. In some examples, the similarity graph generator 148 may construct a similarity graph 146 that represents the trending entities 132b as nodes 101 and the similarity values 150 as edge weights for edges 103 connecting two nodes 101.

In operation 307, similarity filtering is performed by the event detector 120. For example, the similarity threshold 160 is used to filter out noisy connections in the similarity graph 146. The similarity graph filter 162 may filter the similarity graph 146 using the similarity threshold 160, where edges 103 having similarity values 150 below the similarity threshold 160 are removed from the similarity graph 146.

In operation 309, entity clustering is performed by the event detector 120. In some examples, at this stage, the entity clustering engine 138 may execute a clustering algorithm 140 to partition the similarity graph 146 in order to detect the cluster groups 144 of trending entities 132b. In some examples, the clustering algorithm 140 includes a Louvain clustering algorithm having a resolution 142.

In operation 311, cluster linking is performed by the event detector 120. For example, the cluster linker 168 is configured to link cluster groups 144 belonging to the same event 112. Once community detection (e.g., entity clustering) is applied to produce the cluster groups 144 for a period of time, the cluster linker 168 may link to the cluster groups 144 in the previous period of time. In some examples, the cluster linker 168 is configured to construct a bipartite graph where cluster groups 144 in the current period of time are provided and cluster groups 144 in the previous period of time are provided. The edge weight between them is a measure of how many entities these cluster groups 144 share, similar to the cosine similarity described earlier. The cluster linker 168 may filter out any edges whose weight falls below a threshold and perform weighted bipartite matching to find cluster links. When a cluster group 144 is successfully linked, the cluster linker 168 copies over the cluster identifier 166 from the cluster group 144 in the previous period of time onto the cluster group 144 in the current period of time. For any clusters that are not linked, the cluster linker 168 may generate a new, unique cluster identifier 166.

In operation 313, cluster ranking is performed by the event detector 120. For example, the cluster ranker 170 may rank the cluster groups 144. In some examples, the cluster ranker 170 may rank the cluster groups 144 based on the aggregate popularity of the trending entities 132b included within a respective cluster group 144.

In operation 315, the cluster chain 114 is stored in the memory device 110. For example, the linked, ranked list of cluster groups 144 are persisted to the memory device 110 such that they can be retrieved within the cluster chain detector 136 for future cluster linking steps or retrieved by other services (e.g., the timeline manager 163, the trends manager 106, the search manager 161, etc.).

In some examples, the event detector 120 is configured to execute a similarity-based temporal event detection algorithm (e.g., Algorithm 1) to generate the cluster chain 114. For example, Algorithm 1 may be an example of the process flow 300 of FIG. 3. The input to Algorithm 1 may be the message stream 108, the similarity threshold 160 (S), the resolution 142 (R), and the time window 158 (W). The output of Algorithm 1 may be the list of cluster groups 144 for a time interval (e.g., for a minute T). The pseudo code for Algorithm 1 is provided, where its operations are mapped to the operations of FIG. 3. As indicated below, the Algorithm 1 uses a Louvain algorithm, which, in some examples, provides one or more clustering benefits (as further explained later in the disclosure). However, the Algorithm 1 may use any type of community detection algorithm. In addition, as indicated below, Algorithm 1 builds similarity graphs. However, in some examples, similarity graphs are not used to group related entities.

---
Algorithm 1 (pseudo code)
---

M ←empty coOccurrence matrix
Trends ← {set of trending entities}
/* Running on background threads */
for each message in the message stream do
    E ←extract each entity e from a message (*operation 301*)
    Filtered ←filter (E, e ∈ Trends) (*operation 303*)
    for each entity $E_f$ ∈ Filtered do (*operation 303*)
        update Count(M, $E_f$) (*operation 303*)
    end
end
/* Each minute T , via a timer thread */
remove(M,W) /* remove out-of-window updates */
G ←buildSimilarityGraph(M, S) (*operations 305, 307*)
$C_T$ ← Louvain(G, R) (*operation 309*)
$C_{T-1}$ ← fetch clusters for T − 1 (*operation 311*)
Links ←maxWeightedBipartiteMatching($C_T$,$C_{T-1}$) (*operation 311*)
For each $c_t$ ∈ $C_T$ do (*operation 311)
    if ($c_t$ , $c_{t-1}$) ∈ Links then (*operation 311*)
        copy ID from $c_{t-1}$ to $c_t$ (*operation 311*)
    L ← L + $c_t$ (*operation 311*)
end
Sort L (*operation 313*)
Return L Referring back to FIG. 1A, the event detector 120 may execute in an offline analysis mode 122 in order to evaluate the quality of the results of the event detector 120 (using one or more performance metrics to assess its performance), and then alter or adjust one or more parameters of the event detector 120 such as the resolution 142, the similarity threshold 160, and/or the time window 158.

Figure 4:
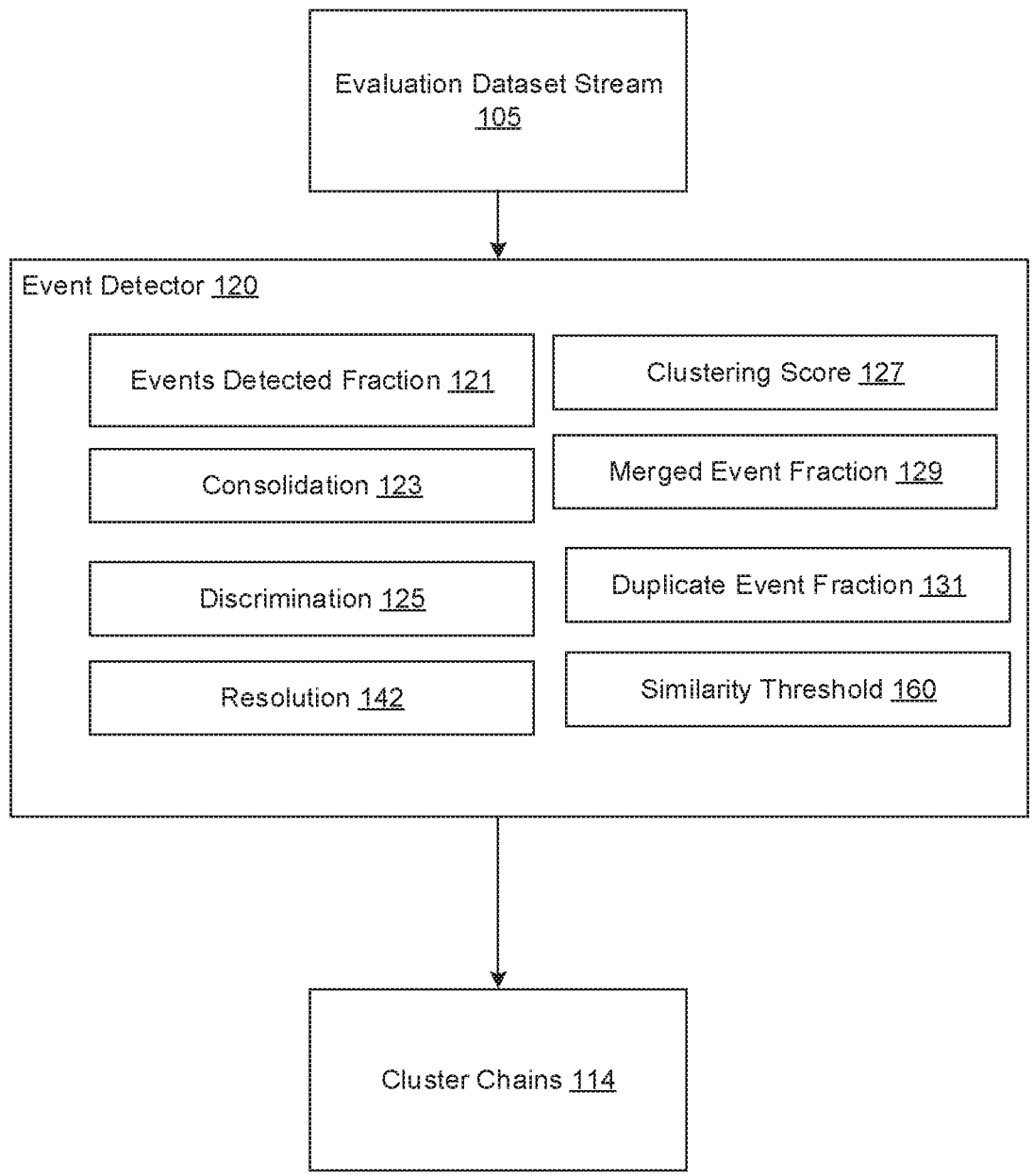
FIG. 4 illustrates an event detector within an offline analysis mode according to an aspect.

FIG. 4 illustrates an example of the event detector 120 in the offline analysis mode 122 according to an aspect. In the offline analysis mode 122, the event detector 120 may receive an evaluation dataset stream 105 and compute the cluster chains 114. In some examples, the evaluation dataset stream 105 includes the messages over a certain period of time (e.g., one day, multiple days, one week, etc.) in a certain geographical area (or multiple geographical areas or worldwide). In some examples, the evaluation dataset stream 105 includes the messages exchanged on the messaging platform 104 over a day (e.g., 24-hour period).

The event detector 120 may extract entities 132 (e.g., hashtags 113, named entities 111, and graph based entities 115, etc.). Then, the event detector 120 may perform the same operations as discussed above but without any similarity filtering (e.g., without filtering the similarity graph 146 using the similarity threshold 160), which products a set of raw cluster chains 114. Then, the entity filtering processes may be tuned in order to optimize cluster quality. For each cluster chain 114, the event detector 120 may obtain all the trending entities 132b from every point in time and produce one deduplicated set of trending entities 132b per cluster chain 114. For each cluster chain 114, a set of representative messages (e.g., 20 messages which may include 10 most re-shared and 10 random messages) that contained at least two co-occurring entities from the cluster chain 114.

In some examples, as part of the offline analysis, the set of representative messages are manually examined, and if the cluster chain 114 corresponds to an event 112, a cluster identifier 166 and title are assigned, as shown in Table 3 below.

TABLE 3

| Trending Entity 132b | Cluster Identifier 166 | Title | Relevant? |
|---|---|---|---|
| #madisonkeys | 1 | US Open Women's Quarterfinals | Y |
| #usopen | 1 | US Open Women's Quarterfinals | Y |
| Minnesota | 1 | US Open Women's Quarterfinals | N |

If the cluster chain 114 contains multiple events 112, different cluster identifiers 166 and titles are created for each of them. Then, all the titles are checked, and the duplicates are merged into a single cluster identifier 166. Also, irrelevant entities are marked and stored as false positive examples (e.g., see Minnesota in Table 3). The dataset is cross-validated by a separate individual to ensure reliability. In one example, the evaluation corpus contains 2695 trending entities 132b and 460 events 112 (e.g., different cluster identifiers 166).

In some examples, in the offline analysis mode 122, the event detector 120 may execute on the same set of messages as the evaluation dataset stream 105 but with different settings, and the performance of the event detector 120 is evaluated with one or more of the following parameters and performance metrics: events detected fraction 121, consolidation 123, discrimination 125, resolution 142, clustering score 127, merged event fraction 129, duplicate event fraction 131, and similarity threshold 160.

The events detected fraction 121 may reflect the coverage of the event detection process. For example, the event detector 120 may compute the fraction of events from evaluation dataset stream 105. A trending entity 132b is defined as being unique if it is related only to one event 112. An event 112 is detected if there exists a cluster group 144 of size greater than one that contains at least one unique trending entity 132b of that event 112. In some examples, clustering quality is not the concern of this metric. Therefore, if there exists a single cluster group 144 containing unique trending entities 132b of several events 112, all of those events 112 are considered to be detected.

Figures 5A, 5B, 5C:
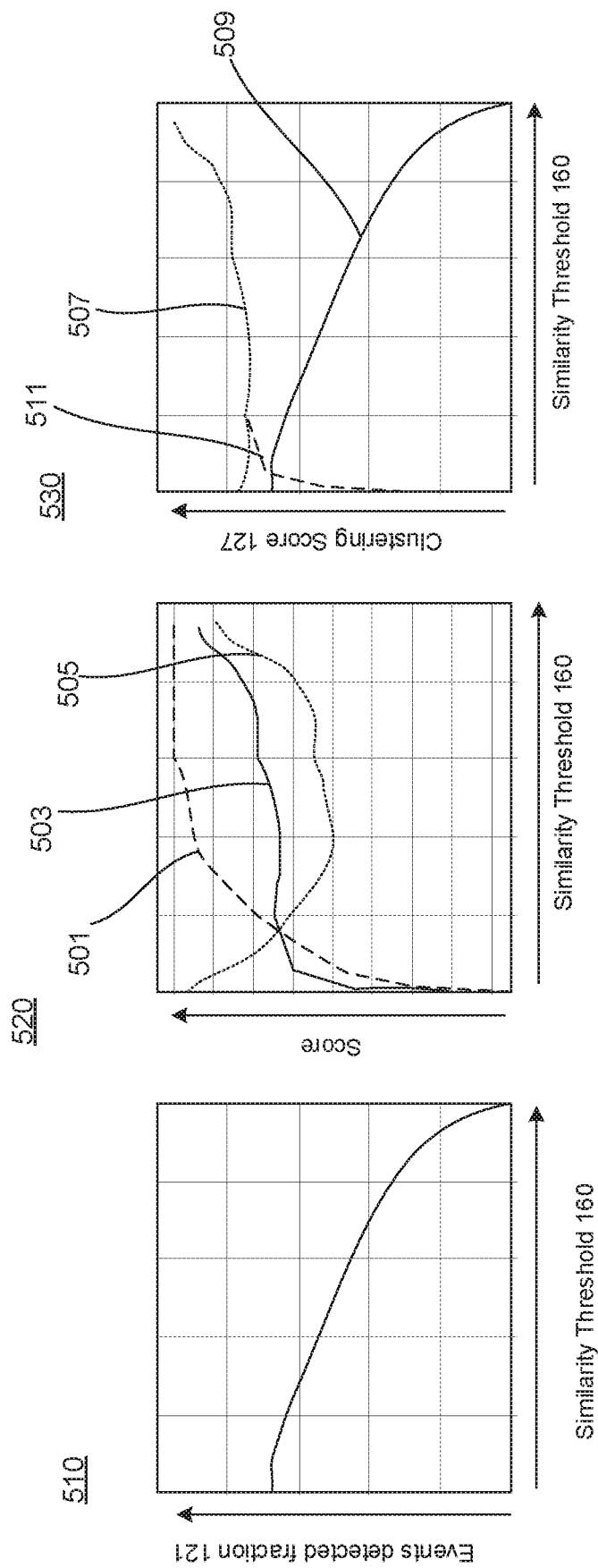

In some examples, the similarity threshold 160 may be considered the primary filter that affects the fraction of events detected. FIG. 5A illustrates a graph 510 depicting the events detected fraction 121 for an increasing value of the similarity threshold 160 according to an aspect. As shown in FIG. 5A, when the similarity threshold 160 is increased, the events detected fraction 121 decreases, which is due to more edges 103 being filtered out. In other words, more nodes 101 are isolated (i.e. without any edge) from the rest of the network and cannot be grouped into cluster groups 144. Note that even with a similarity threshold 160 of zero, the events detected fraction 121 is less than 100%. Given that a cluster group 144 includes at least two nodes 101, events from isolated nodes in the network are not included.

In some examples, the performance metrics include two main metrics, e.g., consolidation 123 and discrimination 125 to assess the quality of the system. In some examples, the consolidation 123 and the discrimination 125 are designed in a manner that they do not penalize for detecting more events 112 than the evaluation dataset stream 105 nor for detecting more trending entities 132b for an event 112. The consolidation 123 and the discrimination 125 may be performance metrics that measure a level of effectiveness at merging entities representing a single event 112 and separating those of different events 112, respectively.

Two trending entities 132b are marked as related if they are a part of single event 112 in the ground truth and both of them are marked as relevant. Two trending entities 132b are referred to as unrelated if they are a part of single event 112 in the ground truth and exactly one of them is marked as irrelevant. In some examples, the techniques discussed herein consider those explicitly marked pairs because most of the entity pairs belonging to different events 112 are easy to distinguish.

Consolidation 123 may be defined as follows:

$$C = \frac{\sum_{t \in t} a_t}{\sum_{t \in T} A_t}. \qquad \text{Eq. (3)}$$

Discrimination 125 may be defined as follows:

$$D = \frac{\sum_{t \in t} b_t}{\sum_{t \in T} B_t}. \qquad \text{Eq. (4)}$$

The following parameters include t: timestamp, T: set of all timestamps in system output, $A_t$: number of related entity pairs that are part of the system output at timestamp t, $a_t$: number of related entity pairs that share a common cluster in the system output at timestamp t, $B_t$: number of unrelated entity pairs that are part of the system output at timestamp t, $b_t$: number of unrelated entity pairs that are not in a common cluster in the system output at timestamp t.

Intuitively, an algorithm may be considered as placing all entities in a single cluster group 144 as achieving 100% consolidation 123 but with 0% discrimination 125. On the other hand, creating a cluster group 144 for each entity will yield 0% consolidation 123 and 100% discrimination 125. In some examples, execution of the event detector 120 in the offline analysis mode 122 may determine which values to use for the parameters (e.g., the similarity threshold 160, the resolution 142, etc.) in order to optimize consolidation 123 and discrimination 125.

In some examples, the consolidation 123 and the discrimination 125 are combined into a single metric, e.g., the clustering score 127, which is defined as follows:

$$CS = \left(\frac{C^{-1} + D^{-1}}{2}\right)^{-1} = \frac{2CD}{C + D} \qquad \text{Eq. (5)}$$

In some examples, the offline analysis can leverage these metrics to understand how the similarity threshold 160 affects the network structure. FIG. 5B illustrates a graph 520 depicting scores (e.g., the clustering score 127, the discrimination 125, the consolidation 123) for increasing values of the similarity threshold 160 when the event detector 120 uses a connected component detection method as the clustering algorithm 140 according to an aspect. Line 501 depicts the discrimination 125, line 503 depicts the clustering score 127, and line 505 depicts the consolidation 123. In FIG. 5B, when the similarity threshold 160 is equal to zero, the consolidation c=1 and the discrimination d=0 since all nodes 101 are connected (i.e. a complete similarity graph 146). With the increase of the similarity threshold 160, more edges 103 are removed from the similarity graph 146, therefore the discrimination 125 increases from 0 to 1.

In some examples, when the similarity threshold 160 is less than a certain value (e.g., S<0.4), the increase of the similarity threshold 160 relates to lower consolidation 123, since more nodes 101 are disconnected. But when the similarity threshold 160 is greater than a certain value (e.g., S>0.4), most edges 103 are removed, thereby making many nodes 101 isolated and not included in the final output. The remaining nodes 101 are connected with heavy edges 103, and relatively high consolidation 123 may be achieved as a result. With that said, the size of the cluster groups 144 and the events detected fraction 121 tend to be smaller.

However, according to some examples, instead of relying on connected components as the clustering algorithm 140, the clustering algorithm 140 may include a Louvain community detection algorithm to achieve increased clustering performance for the similarity threshold 160 (e.g., S<0.4). FIG. 5C illustrates a graph 530 depicting the clustering score 127 for increasing values of the similarity threshold 160 with respect to the connected component algorithm, the Louvain algorithm, and the events detected fraction 121 according to an aspect. Line 507 depicts the Louvain algorithm, line 509 depicts the events detected fraction 121, and line 511 depicts the connected component algorithm. In some examples, when the similarity threshold 160 is less than a certain value (e.g., S<0.2), the Louvain algorithm achieves better performance because it successfully splits components into different cluster groups 144. When the similarity threshold 160 is above a certain value (e.g., S>0.2), the Louvain algorithm achieves the same (or similar) results as the connected component algorithm because the resulting components are too small to be split.

FIG. 5D depicts a graph 540 depicting scores (e.g., the clustering score 127, the discrimination 125, the consolidation 123) for increasing values of the resolution 142 when the event detector 120 uses the Louvain algorithm as the clustering algorithm 140 according to an aspect. Line 513 depicts the consolidation 123, line 515 depicts the clustering score 127, and line 517 depicts the discrimination 125. With the similarity threshold 160 being S=0.1, in some examples, the resolution 142 being equal to one may result in optimal clustering score.

In some examples, the performance metrics include a metric referred to as the merged event fraction 129. For example, in addition to checking cluster quality and coverage, the cluster chains 114 are evaluated. Specifically, the fraction of cluster chains 114 that merge trending entities 132b from different events 112 are checked. In some examples, the merged event fraction 129 may be sensitive not only to clustering quality but also to the quality of cluster linking over time. FIG. 5E illustrates a graph 550 depicting the merged event fraction 129 for different values of the similarity threshold 160. In FIG. 5E, the merged event fraction 129 is compared for increasing values of the similarity threshold 160. Line 519 depicts the connected component algorithm, and line 521 depicts the Louvain algorithm.

In some examples, the performance metrics include a metric referred as the duplicate event fraction 131. In some examples, the duplicate event fraction 131 is defined as the fraction of events in the evaluation dataset stream 105 that have their trending entities 132b identified in more than one cluster chain 114. FIG. 5F illustrates a graph 560 depicting the duplicate event fraction 131 for different values of the similarity threshold 160 according to an aspect. Line 523 depicts the connected component algorithm, and line 525 depicts the Louvain algorithm. In some examples, the duplicate event fraction 131 may be relatively high. In some examples, when the similarity threshold 160 is 0.1, this may result in about 35% of events having duplicate cluster chain 114. In some examples, the high value may be due to the fact that the evaluation dataset stream 105 does not include sub-events. However, as explained later in the specification, a relatively large event 112 may have multiple sub-events, and, in some examples, it may be more accurate to represent them in different cluster chains 114.

Figure 6A:
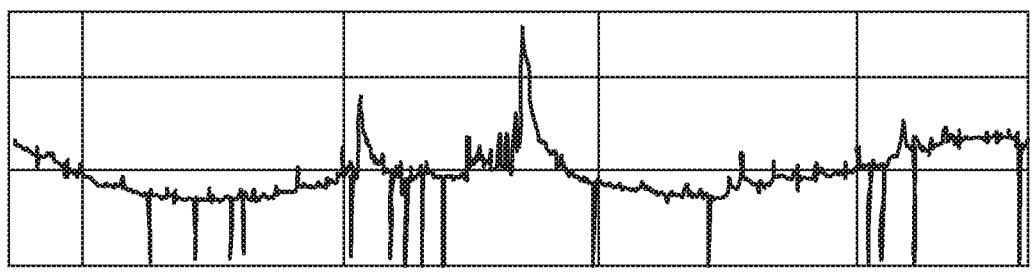
FIGS. 6A through 6C illustrate various graphs depicting the performance of the event detector in an online analysis mode according to an aspect.
Figure 6B:
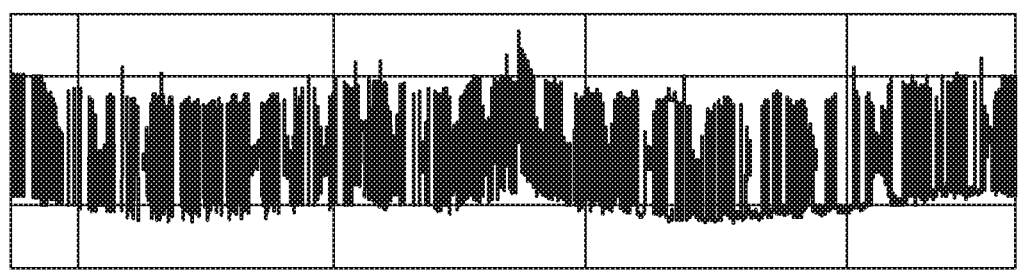
Figure 6C:
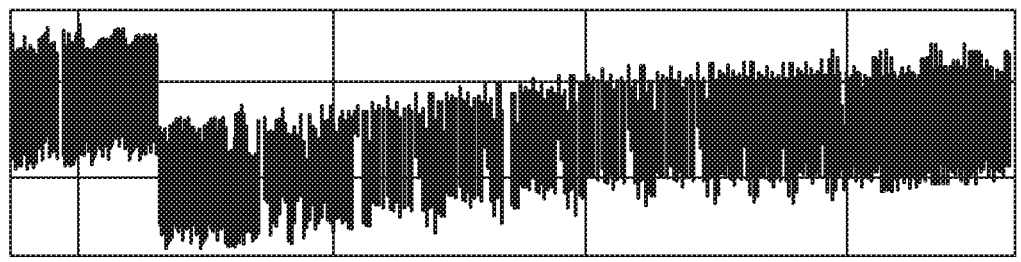

Referring back to FIG. 1A, the event detector 120 may execute in an online analysis mode 124 to generate the cluster chains 114 in real-time. For example, while the messaging platform 104 is actively changing messages between the users, the event detector 120 may receive the message stream 108 and generate (and update) the cluster chains 114 over time in order to identify the events 112 as they are unfolding. In some examples, the event detector 120 is deployed on a Java Virtual Machine (JVM) and relies on Garbage Collection (GC) for memory management. FIGS. 6A through 6C illustrate various profiles of the performance of the event detector 120 in the online analysis mode 124. FIG. 6A illustrates a graph 610 depicting the amount of processed entities per second according to an aspect. FIG. 6B illustrates a graph 620 depicting the CPU utilization profile according to an aspect. FIG. 6C illustrates a graph 630 depicting a memory usage profile according to an aspect. The performance data depicted in FIGS. 6A through 6C are over a relatively prolonged time range and may demonstrate that the event detector 120 is able to scale and process millions of entities per minute.

Figure 7:
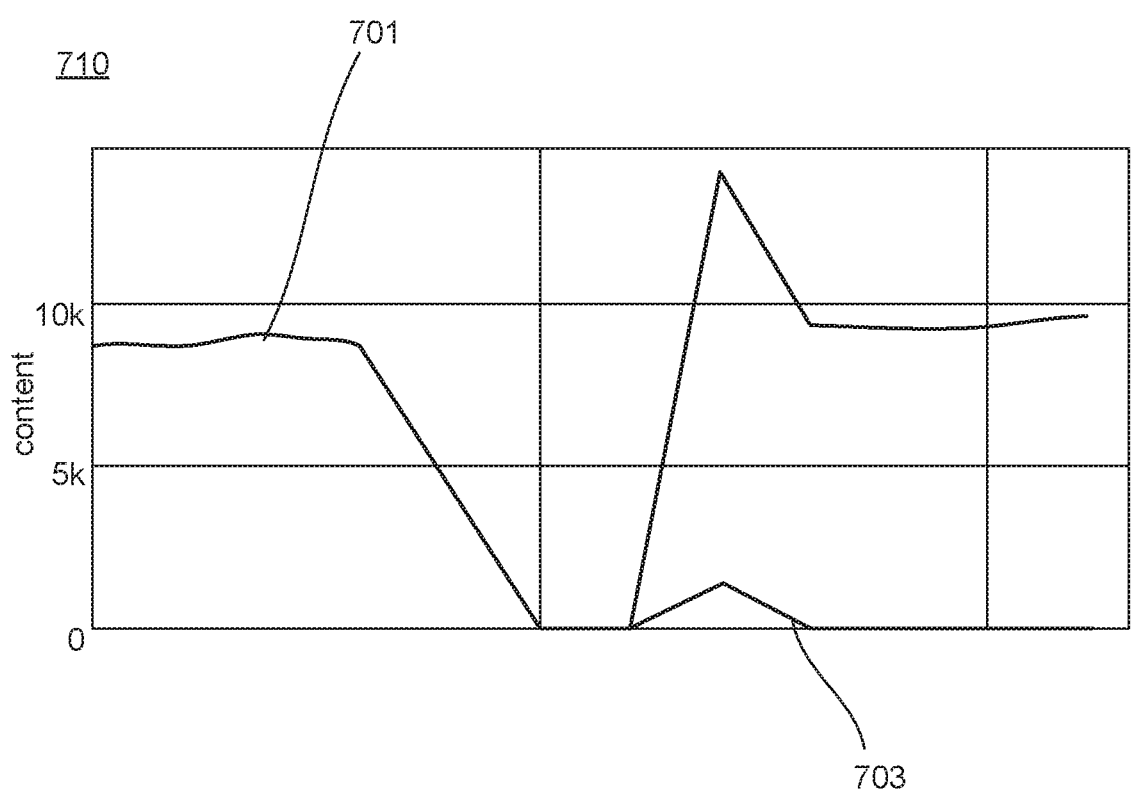
FIG. 7 illustrates a graph depicting the performance of the event detector in the online analysis mode according to an aspect.

With respect to FIG. 6B, the CPU usage is typically low (<10%) and consistent over a normal day of traffic. Similarly, in FIG. 6C, the memory usage is relatively consistent. The decrease in memory usage near the start of the graph 630 depicts a major collection, which occurs only once every 1-2 days due to the stability of long-lived objects, and minor collections steadily occur every 1-2 minutes. In FIG. 6A, with respect to one particular instance at the center, the system is able to handle spikes of up to 50K processed entities per second (PSEC). During this load spike, which represents a doubling of PSEC in a short period of time, the corresponding CPU increase and memory impact as seen in the figures below is relatively negligible. Therefore, the system 100 may exhibit stable CPU and memory usage even when faced with abnormal loads. FIG. 7 illustrates a graph 710 depicting load shedding according to an aspect. In FIG. 7, line 701 represents messages processed per second and line 703 represents dropped messages per second. It is noted that load shedding is temporary (e.g., only takes place during a given minute) and the messaging system 100 resumes to normalcy afterwards.

Figure 8:
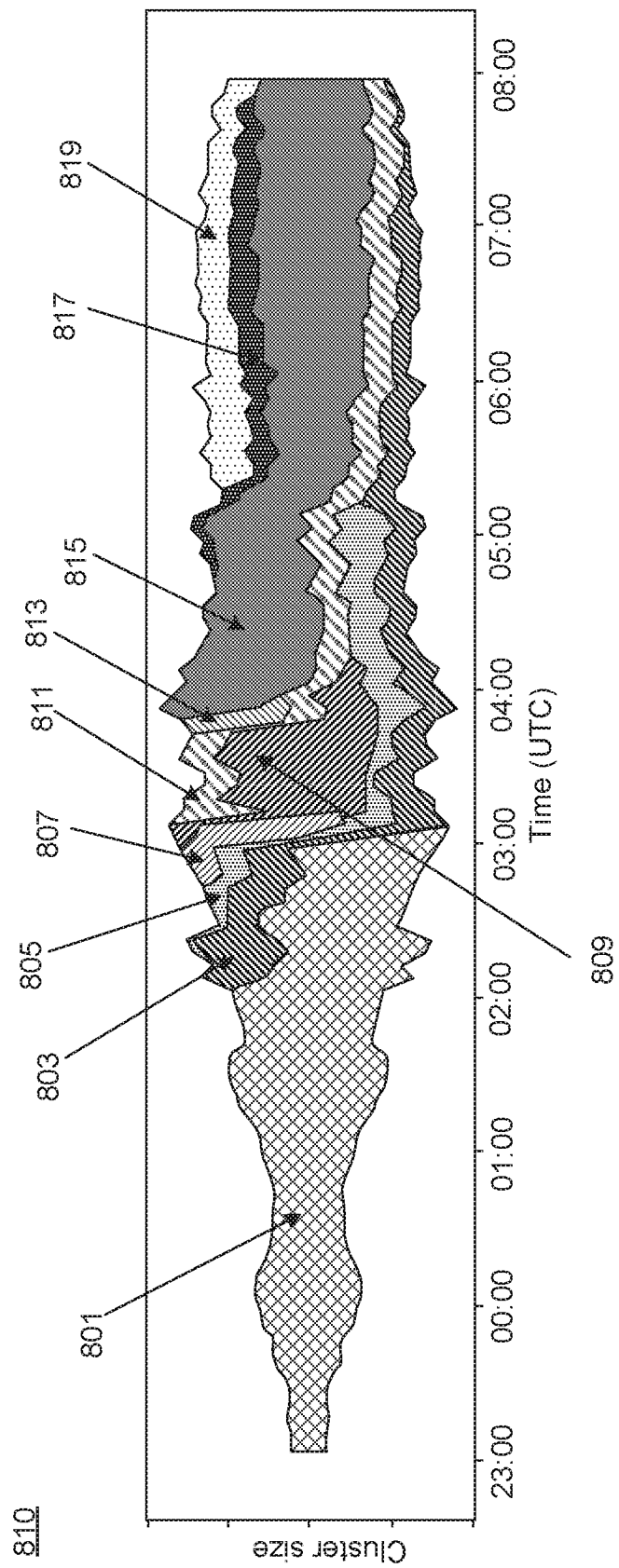
FIG. 8 illustrates an example of a plurality of cluster chains for a real-world event according to an aspect.

FIG. 8 illustrates a graph 810 depicting top cluster chains 114 for a real event according to an aspect. The event depicted in FIG. 8 was the Golden Globe Awards show held on Jan. 6, 2019 starting at 01:00 UTC. This event generated a great degree of conversation on the messaging platform 104. The below description provides an example on how the event detector 120 performed during that event and how accurately it reflected real work conversations. The temporal aspect of the event is shown by how entity clusters emerge, evolve, and disappear.

Table 4 illustrates the top cluster chains 114 (and associated top entities) and the cluster chains 114 mapping to FIG. 8. For example, the cluster chains include chain 801 (General Conversion), chain 803 (Host's Opening Speech), chain 805 (Green Book), chain 807 (Christian Bale receives the best actor in a comedy or musical award for "Vice"), chain 809 (General Conversation), chain 811 (Christian Bale thanks Satan in his acceptance speech), chain 813 (General Conversation), chain 815 (Rami Malek receives the best actor in a drama award for "Bohemian Rhapsody"), chain 817 (Glenn Close receives the best actress in a drama award for "The Wife"), and chain 819 (Green Book).

TABLE 4

| Title | Top Entities |
|---|---|
| 801: General Conversation | The 76$^{th}$ Annual Golden Globe Awards 2019, #goldenglobes, Lady Gaga, Sandra Oh, Spider-Man: Into the Spider-Verse, Gaga |
| 803: Hosts' Opening Speech | Andy Samberg, Black Panther, Sandra Oh, #blackpanther, Jim Carrey, Michael B. Jordan |
| 805: Green Book | Green Book, Maheshala Ali, Regina King, #greenbook |
| 807: Christian Bale receives the best actor in a comedy or musical award for "Vice" | The 76$^{th}$ Annual Golden Globe Awards 2019, #goldenglobes, Christian Bale, Sandra Oh, Lady Gaga, Darren Criss, Vice |
| 809: General Conversation | The 76$^{th}$ Annual Golden Globe Awards 2019, #goldenglobes, Lady Gaga, Jeff Bridges, Darren Criss |
| 811: Christian Bale thanks Satan in his acceptance speech | Christian Bale, The 76$^{th}$ Annual Golden Globe Awards 2019, Vice, Mitch McConnell, Satan |
| 813: General Conversation | The 76$^{th}$ Annual Golden Globe Awards 2019, #goldenglobes, Sandra Oh, Alfonso Cuaron, Rami Malek, Roma, Olivia Colman |
| 815: Rami Malek receives the best actor in a drama award for "Bohemian Rhapsody" | The 76$^{th}$ Annual Golden Globe Awards 2019, #goldenglobes, Rami Malek, Bohemian Rhapsody, Lady Gaga, Sandra Oh |
| 817: Glenn Close receives the best actress in a drama award for "The Wife" | Glenn Close, Taylor Swift, Lady Gaga, best actress, Glenn, Bradley Cooper |
| 819: Green Book | Green Book, Mahershali Ali, Regina King, #greenbook |

FIG. 8 depicts an overview of the event including the ten biggest cluster chains (in terms of total message count) that at any time between January 6th and 7th contain an entity matching "*golden*globes*" pattern where "*" represents any, possibly empty, sequence of characters. In FIG. 8, the event structure is stable outside the main ceremony time, i.e., before 01:00 UTC and after 04:30 UTC. Before the ceremony, all related entities are clustered into a single big chain since no particular theme has yet emerged. After the ceremony, users continue to talk about topics that were popular during the ceremony (e.g. Green Book, Glenn Close, and Rami Malek). However, the most interesting period is during the ceremony itself: the system 100 is able to capture fast evolving topics and create different chains for them.

Figure 9:
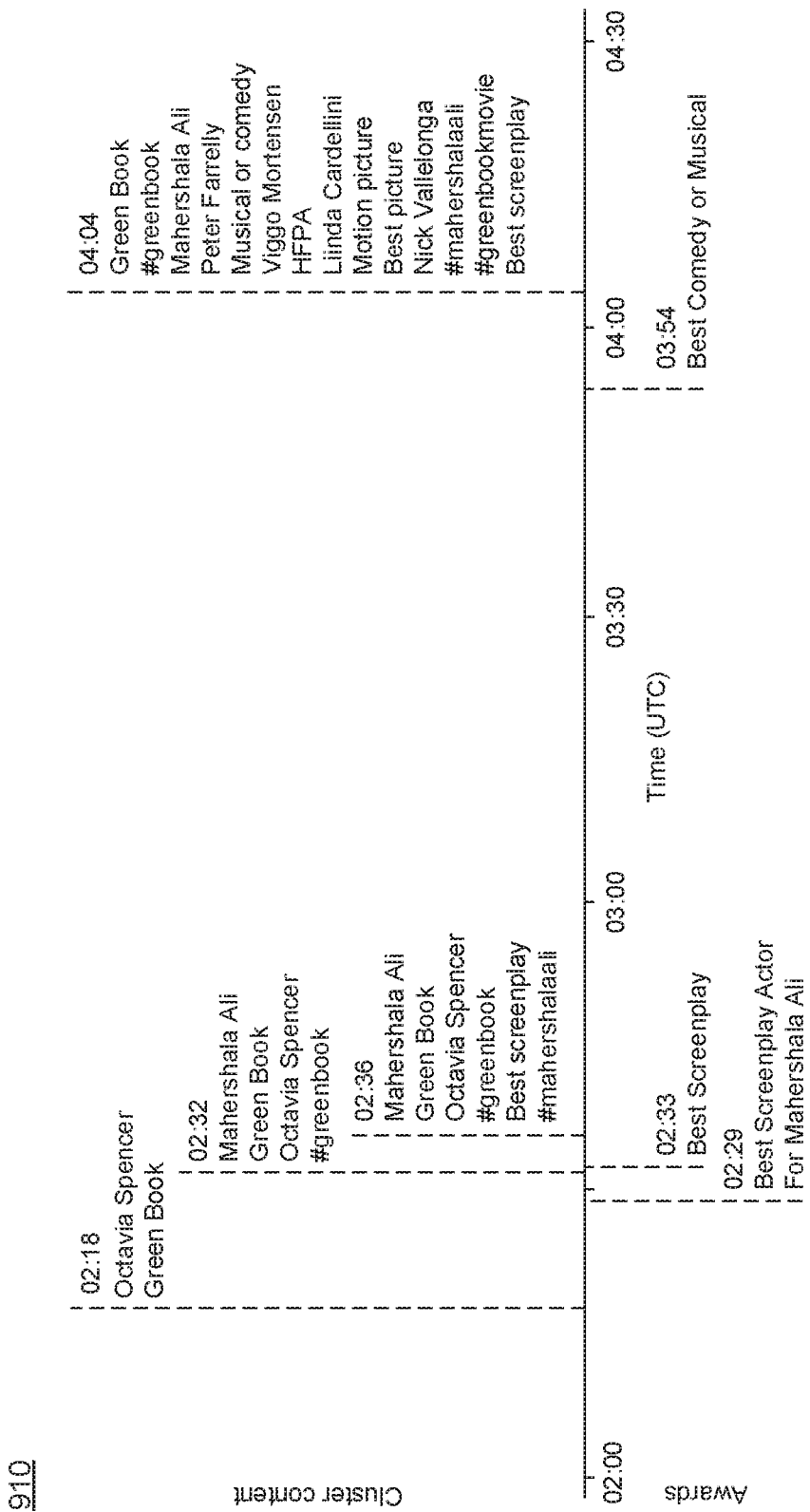
FIG. 9 illustrates details of a cluster chain over time according to an aspect.

Green Book was the most acclaimed movie: it was awarded Best Supporting Actor, Best Screenplay, and Best Musical or Comedy. FIG. 9 depicts a graph 910 showing the Green Book cluster evolution and corresponding award presentation times according to an aspect. In FIG. 9, the Green Book chain (also represented as chain 805 in FIG. 8) evolves over time. At first, the Green Book chain includes entities representing the movie and its executive producer (Olivia Spencer). Shortly after, Mahershala Ali received his award for Best Actor, and the appropriate entity is added to the cluster. Similarly, the "best screenplay" entity is added thereafter. When the Best Musical or Comedy Award is presented, the cluster represents the fully developed conversation: related hashtags are used and film crew members are mentioned. At 05:09 UTC, a new chain (represented as chain 819 in FIG. 8) emerged out of the original Green Book chain (chain 805 in FIG. 8). Subsequently at 05:12 UTC, the new chain absorbed the old one while retaining the new cluster identifier. As these charts can be generated in real time, they can be used for tracking real world events as they unfold.

Figure 10:
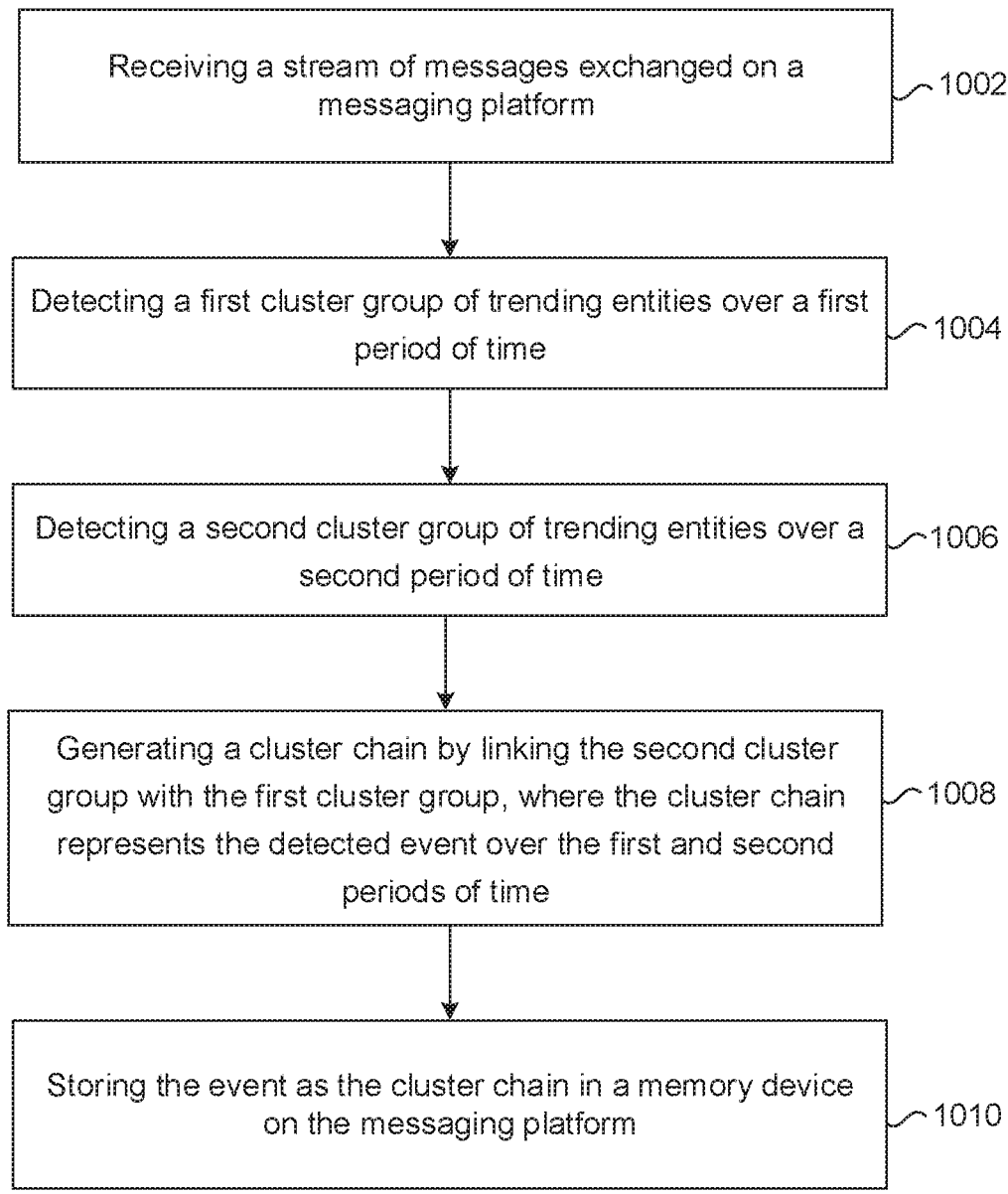
FIG. 10 illustrates a flowchart depicting example operations of a messaging system according to an aspect.

FIG. 10 illustrates a flowchart 1000 depicting example operations of event detection on social data streams according to an aspect. Although the flowchart 1000 is described with reference to the messaging system 100 of FIGS. 1A through 1E, the operations may be executed by any of the embodiments discussed herein. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion.

Operation 1002 includes receiving a stream of messages exchanged on the messaging platform 104. The stream of messages may be part of the message stream 108. Operation 1004 includes detecting a first cluster group 144-1 of trending entities 132*b* over a first period of time 196-1. The first cluster group 144-1 includes two or more trending entities 132*b* that are determined as similar to each other. Operation 1006 includes detecting a second cluster group 144-2 of trending entities 132*b* over a second period of time 196-2. The second cluster group 144-2 includes two or more trending entities 132*b* that are determined as similar to each other. Operation 1008 includes generating a cluster chain 114 by linking the second cluster group 144-2 with the first cluster group 144-1, where the cluster chain 114 represents the detected event 112 over the first and second periods of time 196-1, 196-2. In some examples, the cluster groups 144 are linked based on a number of trending entities being shared between the first cluster group 144-1 and the second cluster group 144-2. Operation 1010 includes storing the event 112 as the cluster chain 114 in a memory device 110 on the messaging platform 104.

Although the disclosed inventive concepts include those defined in the attached claims, it should be understood that the inventive concepts can also be defined in accordance with the following embodiments:

Embodiment 1 is a method for event detection on social data streams, the method comprising receiving, by a messaging platform, a stream of messages exchanged on a messaging platform, and detecting, by the messaging platform, an event from the stream of messages.

Embodiment 2 is the method of embodiment 1, wherein the detecting step includes detecting a first cluster group of trending entities over a first period of time, wherein the first cluster group includes at least two trending entities identified as similar to each other.

Embodiment 3 is the method of any one of embodiments 1 through 2, wherein the detecting step includes detecting a second cluster group of trending entities over a second period of time, where the second cluster group includes at least two trending entities identified as similar to each other.

Embodiment 4 is the method of any one of embodiments 1 through 3, wherein the detecting step includes generating a cluster chain by linking the second cluster group with the first cluster group, where the cluster chain represents the detected event over the first and second periods of time.

Embodiment 5 is the method of any one of embodiments 1 through 4, further comprising storing, by the messaging platform, the event as the cluster chain in a memory device on the messaging platform.

Embodiment 6 is the method of any one of embodiments 1 through 5, further comprising transmitting, by the messaging platform, digital data to a client application to render information about the event in a user interface of the client application, where the information about the event includes information from the cluster chain.

Embodiment 7 is the method of any one of embodiments 1 through 6, wherein the information about the event identifies a first trending entity from the first cluster group and a second trending entity from the second cluster group, the second trending entity being different than the first trending entity.

Embodiment 8 is the method of any one of embodiments 1 through 7, further comprising ranking the first cluster group and the second cluster group.

Embodiment 9 is the method of any one of embodiments 1 through 8, wherein the ranking the first cluster group and the second cluster group is based on popularity of trending entities associated with each respective cluster group, wherein the cluster chain includes a list of ranked cluster groups.

Embodiment 10 is the method of any one of embodiments 1 through 9, further comprising identifying a plurality of trending entities over the first period of time.

Embodiment 11 is the method of any one of embodiments 1 through 10, wherein the first cluster group is detected from the plurality of trending entities over the first period of time.

Embodiment 12 is the method of any one of embodiments 1 through 11, further comprising identifying a plurality of trending entities over the second period of time.

Embodiment 13 is the method of any one of embodiments 1 through 12, wherein the second cluster group is detected from the plurality of trending entities over the second period of time.

Embodiment 14 is the method of any one of embodiments 1 through 13, further comprising assigning a cluster identifier to the first cluster group and assigning the cluster identifier of the first cluster group to the second cluster group in response to the second cluster group being linked to the first cluster group.

Embodiment 15 is the method of any one of the embodiments 1 through 14, wherein the detecting the first cluster group includes generating a similarity graph based on similarity values associated with a plurality of trending entities of the first period of time.

Embodiment 16 is the method of any one of embodiments 1 through 15, wherein the similarity graph includes nodes representing the plurality of trending entities and edges being annotated with the similarity values.

Embodiment 17 is the method of any one of embodiments 1 through 16, further comprising partitioning the similarity graph according to a clustering algorithm to detect the first cluster group.

Embodiment 18 is the method of any one of the embodiments 1 through 17, further comprising computing the similarity values based on frequency count and co-occurrences among the plurality of trending entities over a time window.

Embodiment 19 is the method of any one of the embodiments 1 through 18, further comprising filtering the similarity graph based on a similarity threshold such that edges having similarity values less than the similarity threshold are removed from the similarity graph.

Embodiment 20 is the method of any one of the embodiments 1 through 19, wherein the filtered similarity graph is partitioned according to the clustering algorithm to detect the first cluster group.

Embodiment 21 is the method of any one of the embodiments 1 through 20, wherein the second cluster group is linked the first cluster group based on a maximum weighted bipartite matching.

Embodiment 22 is a system comprising one or more computers and one or more storage devices storing instructions that are operable, when executed by the one or more computers, to cause the one or more computers to perform the method of any one of embodiments 1 through 21.

Embodiment 23 is a computer storage medium encoded with a computer program, the program comprising instructions that are operable, when executed by data processing apparatus, to cause the data processing apparatus to perform the method of any one of embodiments 1 through 21.

Embodiment 24 is a messaging system for detecting real-time event, the messaging system comprising a messaging platform configured to exchange, over a network, messages to computing devices, and a client application configured to communicate with the messaging platform to send and receive messages, wherein the messaging platform is configured to detect a first cluster group of trending entities over a first period of time, where the first cluster group includes at least two trending entities identified as similar to each other.

Embodiment 25 is the messaging system of embodiment 24, wherein the messaging platform is configured to detect a second cluster group of trending entities over a second period of time, where the second cluster group includes at least two trending entities identified as similar to each other.

Embodiment 26 is the messaging system of any one of embodiments 24 through 25, wherein the messaging platform is configured to a cluster chain by linking the second cluster group with the first cluster group based on a number of trending entities being shared between the first cluster group and the second cluster group.

Embodiment 27 is the messaging system of any one of embodiments 24 through 26, wherein the cluster chain represents the detected event over the first and second periods of time.

Embodiment 28 is the messaging system of any one of embodiments 24 through 27, wherein the messaging platform is configured to store an event as the cluster chain in a memory device on the messaging platform.

Embodiment 29 is the messaging system of any one of embodiments 24 through 28, wherein the cluster chain is retrievable for future cluster linking.

Embodiment 30 is the messaging system of any one of embodiments 24 through 29, wherein the messaging platform is configured to transmit digital data to the client application to render information about the event in a user interface of the client application, the information about the event including information from the cluster chain, the information from the cluster chain being rendered in a trends section, a timeline, or part of search results returned to the client application.

Embodiment 31 is the messaging system of any one of the embodiments 24 through 30, wherein the messaging platform is configured to rank the first cluster group and the second cluster group based on an aggregate popularity metric associated with each cluster group.

Embodiment 32 is the messaging system of any one of the embodiments 24 through 31, wherein the messaging platform is configured to obtain a list of trending entities over the first period of time from a trend detector service, extract entities from a stream of messages exchanged on the messaging platform.

Embodiment 33 is the messaging system of any one of embodiments 24 through 32, wherein the messaging platform is configured to filter the extracted entities using the list of trending entities to obtain a plurality of trending entities over the first period of time, wherein the first cluster group is detected using the plurality of trending entities over the first period of time.

Embodiment 34 is the messaging system of any one of the embodiment 24 through 33, wherein the messaging platform is configured to assign a same cluster identifier to cluster groups of a single cluster chain.

Embodiment 35 is the messaging system of any one of the embodiments 24 through 34, wherein the messaging platform is configured to compute similarity values based on frequency count and co-occurrences among trending entities over a time window.

Embodiment 36 is the messaging system of any one of the embodiments 24 through 35, wherein the messaging platform is configured to generate a similarity graph based on the similarity values.

Embodiment 37 is the messaging system of any one of the embodiments 24 through 36, wherein the similarity graph includes nodes representing the trending entities and edges being annotated with the similarity values.

Embodiment 38 is a method that includes operations of the messaging system of any one of embodiments 24 through 37.

Embodiment 39 is a computer storage medium encoded with a computer program, the program comprising instructions that are operable, when executed by data processing apparatus, to cause the data processing apparatus to perform the operations of the messaging system of any one of embodiments 24 through 37.

Embodiment 40 is a non-transitory computer-readable medium storing executable instructions that when executed by at least one processor are configured to cause the at least one processor to receive a stream of messages exchanged on a messaging platform and detect an event from the stream of messages.

Embodiment 41 is the non-transitory computer-readable medium of embodiment 40, further comprising identify a plurality of trending entities from the stream of messages over a first period of time.

Embodiment 42 is the non-transitory computer-readable medium of any one of embodiments 40 through 41, further comprising detect a first cluster group from the plurality of trending entities over the first period of time.

Embodiment 43 is the non-transitory computer-readable medium of any one of embodiments 40 through 42, further comprising identify a plurality of trending entities from the stream of messages over a second period of time.

Embodiment 44 is the non-transitory computer-readable medium of any one of embodiments 40 through 43, further comprising detect a second cluster group from the plurality of trending entities over the second period of time.

Embodiment 45 is the non-transitory computer-readable medium of any one of embodiments 40 through 44, further comprising generate a cluster chain by linking the second cluster group with the first cluster group.

Embodiment 46 is the non-transitory computer-readable medium of any one of embodiments 40 through 45, wherein the cluster chain represents the detected event over the first and second periods of time.

Embodiment 47 is the non-transitory computer-readable medium of any one of embodiments 40 through 46, further comprising transmit digital data to a client application to render information about the event in a user interface of the client application.

Embodiment 48 is the non-transitory computer-readable medium of any one of embodiments 40 through 47, wherein the information about the event includes information from the cluster chain, and the information from the cluster chain identifies a first trending entity from the first cluster group and a second trending entity from the second cluster group.

Embodiment 49 is the non-transitory computer-readable medium of any one of embodiments 40 through 48, further comprising rank the first cluster group and the second cluster group based on a popularity metric associated with each respective cluster group.

Embodiment 50 is the non-transitory computer-readable medium of any one of embodiments 40 through 49, further comprising extract entities from the stream of messages, the entities including at least one of named entities or hashtags.

Embodiment 51 is the non-transitory computer-readable medium of any one of embodiments 40 through 50, further comprising obtain a list of trending entities derived from a trend detector service via a server communication interface.

Embodiment 52 is the non-transitory computer-readable medium of any one of embodiments 40 through 51, further comprising identify the plurality of trending entities over the first period of time from the extracted entities based on the list of trending entities such that non-trending entities are filtered out of the extracted entities.

Embodiment 53 is the non-transitory computer-readable medium of any one of embodiments 40 through 52, further comprising assign a cluster identifier to the first cluster group and assign the cluster identifier of the first cluster group to the second cluster group in response to the second cluster group being linked to the first cluster group.

Embodiment 54 is the non-transitory computer-readable medium of any one of embodiments 40 through 53, further comprising compute similarity values based on frequency count and co-occurrences among the plurality of trending entities over a time window.

Embodiment 55 is the non-transitory computer-readable medium of any one of embodiments 40 through 54, wherein each similarity value indicates a level of similarity between two trending entities.

Embodiment 56 is the non-transitory computer-readable medium of any one of embodiments 40 through 55, further comprising generate a similarity graph based on the similarity values.

Embodiment 57 is the non-transitory computer-readable medium of any one of embodiments 40 through 56, wherein the similarity graph includes nodes representing the plurality of trending entities and edges being annotated with the similarity values.

Embodiment 58 is the non-transitory computer-readable medium of any one of embodiments 40 through 57, further comprising filter the similarity graph based on a similarity threshold value such that edges having similarity values less than the similarity threshold are removed from the similarity graph.

Embodiment 59 is the non-transitory computer-readable medium of any one of embodiments 40 through 58, further comprising partition the filtered similarity graph according to a clustering algorithm to detect the first cluster group.

Embodiment 60 is the non-transitory computer-readable medium of any one of embodiments 40 through 59, wherein the clustering algorithm includes a Louvain algorithm.

Embodiment 61 is the non-transitory computer-readable medium of any one of embodiments 40 through 60, wherein the plurality of trending entities over the first period of time and the second period of time are identified from the stream of messages by a burst detector, wherein the first and second cluster groups are detected and the cluster chain is generated by a cluster chain detector, further comprising adjust computer resources of the burst detector.

Embodiment 62 is the non-transitory computer-readable medium of any one of embodiments 40 through 61, further comprising adjust computer resources of the cluster chain detector independently of the adjustment of the computer resources of the burst detector.

Embodiment 63 is the non-transitory computer-readable medium of any one of embodiments 40 through 62, wherein one or more operations of the burst detector are performed in parallel with one or more operations of the cluster chain detector.

Embodiment 64 is a system comprising one or more computers and one or more storage devices storing instructions that are operable, when executed by the one or more computers, to cause the one or more computers to perform the operations of the non-transitory computer-readable medium of embodiments 40 through 63.

Embodiment 65 is a method having steps of the operations of the non-transitory computer-readable medium of embodiments 40 through 63.

Embodiment 66 is a messaging system for detecting real-time events on a social media stream, the messaging system comprising a messaging platform configured to exchange, over a network, messages to computing devices, the messaging platform including an event detector configured to execute in an offline mode and an online mode.

Embodiment 67 is the messaging system of embodiment 66, wherein the event detector, in the offline mode, is configured to execute an event detection algorithm on an evaluation dataset stream to generate one or more first cluster chains for varying values of a control parameter, compute a performance metric regarding the execution of the event detection algorithm for the varying values of the control parameter, wherein a value of the control parameter is selected based on the performance metric.

Embodiment 68 is the messaging system of any one of embodiments 66 through 67, wherein the event detector, in the online mode, is configured to receive a message stream for messages exchanged on the messaging platform in real-time, and execute the event detection algorithm on the message stream according to the selected value of the control parameter to generate one or more second cluster chains.

Embodiment 69 is the messaging system of any one of embodiments 66 through 68, wherein the performance metric includes at least one of discrimination or consolidation, the control parameter including a similarity threshold.

Embodiment 70 is the messaging system of any one of embodiments 66 through 69, wherein the performance metric includes at least one of discrimination or consolidation, the control parameter including a resolution of a clustering algorithm.

Embodiment 71 is a method that include operations of the messaging system of any one of embodiments 66 through 70.

Embodiment 72 is a computer storage medium encoded with a computer program, the program comprising instructions that are operable, when executed by data processing apparatus, to cause the data processing apparatus to perform the operations of the messaging system of any one of embodiments 66 through 70.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "detecting," "transmitting," "receiving," "generating," "storing," "ranking," "extracting," "obtaining," "assigning," "partitioning," "computing," "filtering," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for event detection on social data streams, the method comprising:
   identifying a plurality of trending entities from messages posted to a messaging platform, wherein a trending entity is an entity mentioned by users in the messages posted to the messaging platform at a rate higher than other entities;
   executing one or more similarity-based clustering operations on the plurality of trending entities to detect a first cluster group of trending entities over a first period of time and a second cluster group of trending entities over a second period of time;

determining that the second cluster group is related to the first cluster group;
generating a cluster chain by linking the second cluster group with the first cluster group, the cluster chain representing an event over the first and second periods of time; and
storing the cluster chain in a memory device on the messaging platform.

2. The method of claim 1, further comprising:
transmitting digital data to a client application of a user device to render information about the event in a user interface of the client application, the information identifying a first trending entity from the first cluster group and a second trending entity from the second cluster group.

3. The method of claim 1, further comprising:
receiving a search query from a client application of a user device to search the messages posted to the messaging platform;
identifying a first trending entity from the first cluster group as matching a term of the search query; and
transmitting, in response to the search query, search results to the client application, the search results identifying the first trending entity and a second trending entity from the second cluster group.

4. The method of claim 1, further comprising:
generating ranking information by ranking a plurality of cluster groups, including the first cluster group and the second cluster group, based on popularity metrics of trending entities associated with each cluster group; and
storing the ranking information in the memory device.

5. The method of claim 1, further comprising:
retrieving the cluster chain from the memory device; and
linking the second cluster group with a third cluster group having at least two trending entities identified as similar to each other during a third period of time.

6. The method of claim 1, further comprising:
assigning a cluster identifier to the first cluster group; and
assigning the cluster identifier of the first cluster group to the second cluster group in response to the second cluster group being linked to the first cluster group.

7. The method of claim 1, wherein the one or more similarity-based clustering operations include:
generating a similarity graph based on similarity values associated with the plurality of trending entities, the similarity graph including nodes representing the plurality of trending entities and edges being annotated with the similarity values; and
partitioning the similarity graph according to a clustering algorithm to detect the first cluster group.

8. The method of claim 7, wherein the one or more similarity-based clustering operations include:
computing the similarity values based on frequency count and co-occurrences among the plurality of trending entities over a time window; and
filtering the similarity graph based on a similarity threshold such that edges having similarity values less than the similarity threshold are removed from the similarity graph, wherein the filtered similarity graph is partitioned according to the clustering algorithm to detect the first cluster group.

9. The method of claim 8, further comprising:
computing a first entity vector and a second entity vector for a pair of trending entities in the first cluster group, each of the first entity vector and the second entity vector including a series of values that indicate the frequency count and co-occurrences of a respective trending entity in the messages posted to the messaging platform; and
computing a similarity value between the first trending entity and the second trending entity by executing a cosine similarity function using the first entity vector and the second entity vector.

10. The method of claim 1, wherein the second cluster group is determined as related to the first cluster group based on maximum weighted bipartite matching between the first cluster group and the second cluster group.

11. The method of claim 1, further comprising:
computing an edge weight between the first cluster group and the second cluster group based on how many trending entities that are shared between the first cluster group and the second cluster group; and
generating the link between the first cluster group and the second cluster group in response to the edge weight being greater than a threshold level.

12. A messaging system for detecting real-time event, the messaging system comprising:
at least one processor; and
a non-transitory computer-readable medium storing executable instructions that when executed by the at least one processor cause the at least one processor to:
identify a plurality of trending entities from messages posted to a messaging platform, wherein a trending entity is an entity mentioned by users in the messages posted to the messaging platform at a rate higher than other entities;
execute one or more similarity-based clustering operations on the plurality of trending entities to detect a first cluster group of trending entities over a first period of time and a second cluster group of trending entities over a second period of time, the first cluster group including at least two trending entities identified as similar to each other during the first period of time, the second cluster group including at least two trending entities identified as similar to each other during the second period of time;
determine that the second cluster group is related to the first cluster group based on how many trending entities are shared between the first cluster group and the second cluster group;
generate a cluster chain by linking the second cluster group with the first cluster group, the cluster chain representing an event over the first and second periods of time; and
store the cluster chain in a memory device on the messaging platform.

13. The messaging system of claim 12, wherein the executable instructions include instructions that when executed by the at least one processor cause the at least one processor to:
transmit digital data to a client application of a user device to render information about the event in a user interface of the client application, the information identifying a first trending entity from the first cluster group and a second trending entity from the second cluster group.

14. The messaging system of claim 12, wherein the executable instructions include instructions that when executed by the at least one processor cause the at least one processor to:

generate ranking information by ranking a plurality of cluster groups, including the first cluster group and the second cluster group, based on an aggregate popularity metric associated with each cluster group; and store the ranking information in the memory device.

15. The messaging system of claim 12, wherein the executable instructions include instructions that when executed by the at least one processor cause the at least one processor to:
obtain a list of trending entities from a trend detector service;
extract entities from the messages posted to the messaging platform; and
filter the extracted entities using the list of trending entities to obtain the plurality of trending entities.

16. The messaging system of claim 12, wherein the executable instructions include instructions that when executed by the at least one processor cause the at least one processor to:
assign a same cluster identifier to cluster groups of a single cluster chain.

17. The messaging system of claim 12, wherein the executable instructions include instructions that when executed by the at least one processor cause the at least one processor to:
compute similarity values based on frequency count and co-occurrences among trending entities over a time window and generate a similarity graph based on the similarity values, the similarity graph including nodes representing the trending entities and edges being annotated with the similarity values.

18. The messaging system of claim 12, wherein the executable instructions include instructions that when executed by the at least one processor cause the at least one processor to:
detect different terms that are used to describe the event on the messaging platform by periodically detecting and linking cluster groups over time.

19. The messaging platform of claim 12, wherein the executable instructions include instructions that when executed by the at least one processor cause the at least one processor to:
retrieve the cluster chain from the memory device and link the second cluster group with a third cluster group having at least two trending entities identified as similar to each other during a third period of time.

20. A non-transitory computer-readable medium storing executable instructions that when executed by at least one processor are configured to cause the at least one processor to execute operations, the operations comprising:
identify a plurality of trending entities from messages posted to a messaging platform, wherein a trending entity is an entity mentioned by users in the messages posted to the messaging platform at a rate higher than other entities;
execute one or more similarity-based clustering operations on the plurality of trending entities to detect a first cluster group of trending entities over a first period of time and a second cluster group of trending entities over a second period of time, the first cluster group including at least two trending entities identified as similar to each other during the first period of time, the second cluster group including at least two trending entities identified as similar to each other during the second period of time;
determine that the second cluster group is related to the first cluster group;

generate a cluster chain by linking the second cluster group with the first cluster group, the cluster chain representing an event over the first and second periods of time;
store the cluster chain in a memory device of the messaging platform; and
transmit digital data to a client application of a user device to render information about the event in a user interface of the client application, the information identifying a first trending entity from the first cluster group and a second trending entity from the second cluster group.

21. The non-transitory computer-readable medium of claim 20, wherein the operations include:
compute a popularity metric for each trending entity of a respective cluster group based on how many times a respective trending entity is mentioned in the messages posted to the messaging platform;
aggregate the popularity metrics for trending entities of the respective cluster group to compute an overall popularity metric for the respective cluster group;
generate ranking information by ranking a plurality of cluster groups, including the first cluster group and the second cluster group, based on the overall popularity metric associated with each cluster group; and
store the ranking information in the memory device.

22. The non-transitory computer-readable medium of claim 20, wherein the operations include:
extract entities from the messages posted to the messaging platform, the entities including at least one of named entities or hashtags;
obtain a list of trending entities from a trend detector service via a server communication interface; and
identify the plurality of trending entities from the extracted entities based on the list of trending entities such that non-trending entities are filtered out of the extracted entities.

23. The non-transitory computer-readable medium of claim 20, wherein the operations include:
assign a cluster identifier to the first cluster group; and
assign the cluster identifier of the first cluster group to the second cluster group in response to the second cluster group being linked to the first cluster group.

24. The non-transitory computer-readable medium of claim 20, wherein the operations include:
compute similarity values based on frequency count and co-occurrences among the plurality of trending entities over a time window, each similarity value indicating a level of similarity between two trending entities;
generate a similarity graph based on the similarity values, the similarity graph including nodes representing the plurality of trending entities and edges being annotated with the similarity values;
filter the similarity graph based on a similarity threshold value such that edges having similarity values less than the similarity threshold are removed from the similarity graph; and
partition the filtered similarity graph according to a clustering algorithm to detect the first cluster group, the clustering algorithm including a Louvain algorithm.

25. The non-transitory computer-readable medium of claim 24, wherein the operations include:
compute a first entity vector and a second entity vector for a pair of trending entities in the first cluster group, each of the first entity vector and the second entity vector including a series of values that indicate the frequency count and co-occurrences of a respective trending entity in the messages posted to the messaging platform; and compute a similarity value between the first trending entity and the second trending entity by executing a cosine similarity function using the first entity vector and the second entity vector.

26. The non-transitory computer-readable medium of claim 20, wherein the plurality of trending entities are identified by a burst detector, wherein the one or more similarity-based clustering operations are executed by a cluster chain detector, wherein the operations include:

independently monitor computing resources of the burst detector and computing resources of the cluster chain; and adjust the computer resources of the cluster chain detector independently of the computer resources of the burst detector.

27. The non-transitory computer-readable medium of claim 26, wherein one or more operations of the burst detector are performed in parallel with the one or more similarity-based clustering operations of the cluster chain detector.

28. The non-transitory computer-readable medium of claim 20, wherein the operations include:

receive a search query from the client application to search the messages posted to the messaging platform;

identify the first trending entity from the first cluster group as matching a term of the search query; and transmit, in response to the search query, search results to the client application, the search results identifying the first trending entity and the second trending entity from the second cluster group, the second trending entity not matching the term of the search query.

* * * * *